United States Patent [19]
Susa et al.

[11] Patent Number: 5,353,757
[45] Date of Patent: Oct. 11, 1994

[54] VEHICULAR USE COOLING APPARATUS

[75] Inventors: Sumio Susa, Anjo; Akihito Tanaka, Toyohashi; Tatsuo Sugimoto, Kariya; Atsushi Katoh, Nagoya; Kazutaka Suzuki, Kariya, all of Japan

[73] Assignee: Nippondenso Co., Ltd., Kariya, Japan

[21] Appl. No.: 90,694

[22] Filed: Jul. 13, 1993

[30] Foreign Application Priority Data

Jul. 13, 1992 [JP] Japan ................... 4-184888
Nov. 30, 1992 [JP] Japan ................... 4-320618

[51] Int. Cl.⁵ ............................... F01P 3/00
[52] U.S. Cl. ..................... 123/41.29; 123/41.31; 165/51
[58] Field of Search ............... 123/41.10, 41.29, 41.31, 123/41.51, 559.1; 60/599; 165/51

[56] References Cited

U.S. PATENT DOCUMENTS 4,893,589  1/1990  Spinnler .
5,215,044  6/1993  Banzhaf et al. ................. 123/41.29

FOREIGN PATENT DOCUMENTS 58-8221    1/1983  Japan .
61-237820 10/1986  Japan .
64-53013   3/1989  Japan .

*Primary Examiner*—Noah P. Kamen
*Attorney, Agent, or Firm*—Cushman, Darby & Cushman

[57] ABSTRACT

A cooling apparatus for use in a vehicle is provided in which the cooling water of the water-cooled internal combustion engine is guided into a first portion of the radiator and the cooling water of another water-cooled apparatus such as a water-cooled innercooler of a super charger is guided into a second portion of the radiator. The first radiator portion and the second radiator portion can be selectively fluidly connected so that cooling water from one radiator portion can assist cooling in the other radiator portion.

14 Claims, 21 Drawing Sheets

ENGINE OUTLET WATER TEMPERATURE Tw

VEHICULAR USE COOLING APPARATUS

BACKGROUND OF THE INVENTION

1. Field of the Invention

The present invention relates to a vehicular use cooling apparatus provided with a radiator for dissipating the heat from the cooling water in a water-cooled internal combustion engine and also a radiator for dissipating heat from the cooling water of other water-cooled cooling systems such as a water-cooled intercooler.

2. Description of the Related Art

As shown in FIG. 32, for example, a radiator 102 for dissipating the heat from the cooling water in the internal combustion engine 101 and a radiator 104 for dissipating heat from cooling water of a water-cooled intercooler 103 have different requirements for the cooling performances for the cooling water and therefore are usually separately provided so as to form mutually independent cooling systems.

SUMMARY OF THE INVENTION

An internal combustion engine 101 for a vehicle carries a large-sized radiator 102 with a large heat radiation capacity so as to keep the engine from overheating even when the vehicle is running uphill at a slow speed in the summer. During normal driving, however, there is a surplus cooling capacity of the radiator 102.

Also, when another radiator 104 is mounted in the internal combustion engine in addition to the radiator 102, it is necessary to provide air ducts in the engine compartment for guiding the cooling air, so the installation becomes difficult and the size of the individual radiators becomes limited.

The present invention was made in consideration of the above circumstances and has as its object the provision of a cooling apparatus for a vehicle which enables the surplus cooling capacity of the radiator for dissipating the heat from the cooling water in the internal combustion engine to be used for the dissipation of heat from the cooling water of other water-cooled cooling systems and which enables occasional utilization in the reverse fashion as well.

The vehicular use cooling apparatus of the present invention is basically provided with a first radiator provided in the cooling water circuit of a water-cooled internal combustion engine, a second radiator provided in the cooling water circuit of a water-cooled cooling system different from the internal combustion engine, a switching means for switching and supplying the cooling water for the internal combustion engine and the cooling water for the other water-cooled cooling system to both the first radiator and the second radiator, and a control means for controlling the switching means in accordance with the state of operation of the internal combustion engine.

In an embodiment of the invention, the first radiator and the second radiator are constituted by the same water passage system, and the switching means is constituted by a connection means provided so as to enable connection or disconnection between the first radiator and the second radiator, a first water supplying means for supplying the cooling water for the internal combustion engine to the first radiator, and a second water supplying means for supplying the cooling water for the water-cooled cooling system to the second radiator.

In another embodiment, provision is made of a first radiator provided in the cooling water circuit of a water-cooled internal combustion engine, a second radiator provided in the cooling water circuit of a water-cooled cooling system different from the internal combustion engine, a third radiator constituted by the same water passage system as the first radiator and the second radiator, a switching means for switching between the cooling water for the internal combustion engine and the cooling water for the other water-cooled cooling system and selectively supplying the same to the first radiator, the second radiator, and the third radiator, and a control means for operating the switching means in accordance with the state of operation of the internal combustion engine.

In still another embodiment, provision is made of a first radiator for dissipating the heat from the cooling water of a water-cooled internal combustion engine for a vehicle, a second radiator for dissipating the heat from the cooling water of a water-cooled cooling system different from the internal combustion engine, a third radiator having a cooling water line independent from the first and second radiators, a switching means for switching and supplying to the third radiator the cooling water used for the internal combustion engine and the cooling water for the other water-cooled cooling system, and a control means for switching the switching means in accordance with the state of operation of the internal combustion engine.

In this case, the first, second, and third radiators may be provided integrally.

In the vehicular use cooling apparatus of the present invention, basically, by controlling the switching means in accordance with the operating state of the internal combustion engine, it is possible to use both the first radiator and the second radiator for dissipating the heat from the cooling water of the internal combustion engine during operation when climbing a slope at low speed in the summer and to use just the first radiator for dissipating the heat from the cooling water of the internal combustion engine during normal operation.

Further, for example, it is possible to use both the first and second radiators to discharge the heat from the cooling water of the water-cooled cooling system when the temperature of the cooling water of the internal combustion engine is low (during warmup operation) and to use only the second radiator to discharge the heat from the cooling water of the water-cooled cooling system when the temperature of the cooling water of the internal combustion engine rises (during the above normal operation).

In a vehicular use cooling apparatus according to another embodiment, it is possible to selectively use the radiators for dissipating the heat from the cooling water of the internal combustion engine and the cooling water of the water-cooled cooling system in accordance with the operating state of the internal combustion engine.

Further, in a vehicular use cooling apparatus according to another embodiment, when it is determined that the cooling capacity of the cooling water of the internal combustion engine is sufficient with just the first radiator, the switching means is operated and the cooling water of the water-cooled cooling system is fed to a third radiator. Thanks to this, the cooling performance of the cooling water of the water-cooled cooling system rises.

When determining that the cooling performance of the cooling water of the internal combustion engine is insufficient with just the first radiator, such as in operation when climbing a slope at a slow speed in the summer, the control apparatus operates the switching means and supplies the cooling water used for the internal combustion engine to the third radiator. This enables the cooling performance of the cooling water of the internal combustion engine to be raised and prevents overheating of the internal combustion engine.

In the vehicular use cooling apparatus of the present invention, the cooling performance for dissipating heat from the cooling water of the internal combustion engine which was surplus at the time of ordinary operation in the prior art can be utilized for water-cooled cooling systems other than the internal combustion engine and therefore the cooling performance of the cooling water of the other water-cooled cooling systems can be made larger.

In other words, while it used to be difficult to raise the cooling performance of the water-cooled cooling systems other than the internal combustion engine due to the limitations on the installation space arising due to the larger size of radiators and due to the rise in costs due to the larger size of radiators, the utilization of the surplus cooling performance of the radiator of the internal combustion engine enables the cooling capacity of the water-cooled cooling systems other than the internal combustion engine to be enlarged without limits on installation space due to the larger size and without higher costs.

BRIEF DESCRIPTION OF THE DRAWINGS

The other objects and effects of the present invention will be clear from the following description of preferred embodiments, wherein.

DESCRIPTION OF THE PREFERRED EMBODIMENTS

One embodiment of the vehicular use cooling apparatus of the present invention will be explained based on FIG. 1 to FIG. 6.

Figure 1:
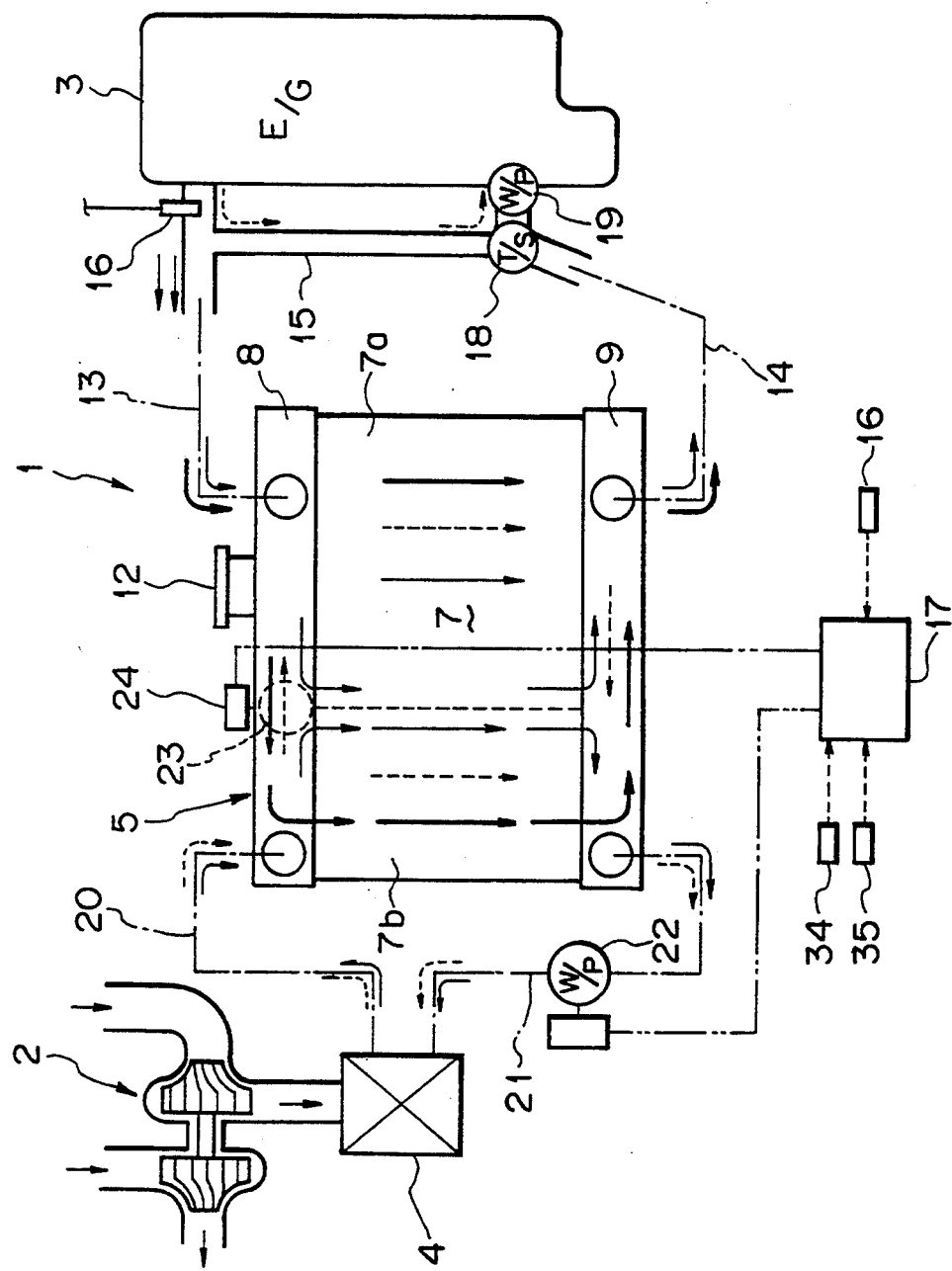
FIG. 1 is a view of the general structure of a vehicular use cooling apparatus according to a first embodiment of the present invention.

FIG. 1 is a view of the general structure of a vehicular use cooling apparatus.

The vehicular use cooling apparatus 1 of the present embodiment is provided with a radiator 5 for dissipating the heat from and thus cooling the cooling water of a water-cooled engine 3 provided with a supercharger 2 and the cooling water used for a water-cooled intercooler 4 (example of water-cooled cooling system) for cooling air compressed by the supercharger 2.

The radiator assembly 5 includes a radiator 7 formed by a plurality of tubes 6 through which cooling water runs (see FIG. 2 and FIG. 3) and corrugated fins (not shown) arranged in an alternate fashion, an upper tank 8 provided at the top side of the radiator 7, and a lower tank 9 provided at the bottom of the radiator 7.

The radiator 7 is provided in a manner able to be split to a first radiator portion 7a and a second radiator portion 7b by a later mentioned switching means. The first radiator portion 7a is inserted in the cooling water circuit on the engine 3 side, while the second radiator portion 7b is inserted in the cooling water circuit on the intercooler 4 side.

Figure 3:
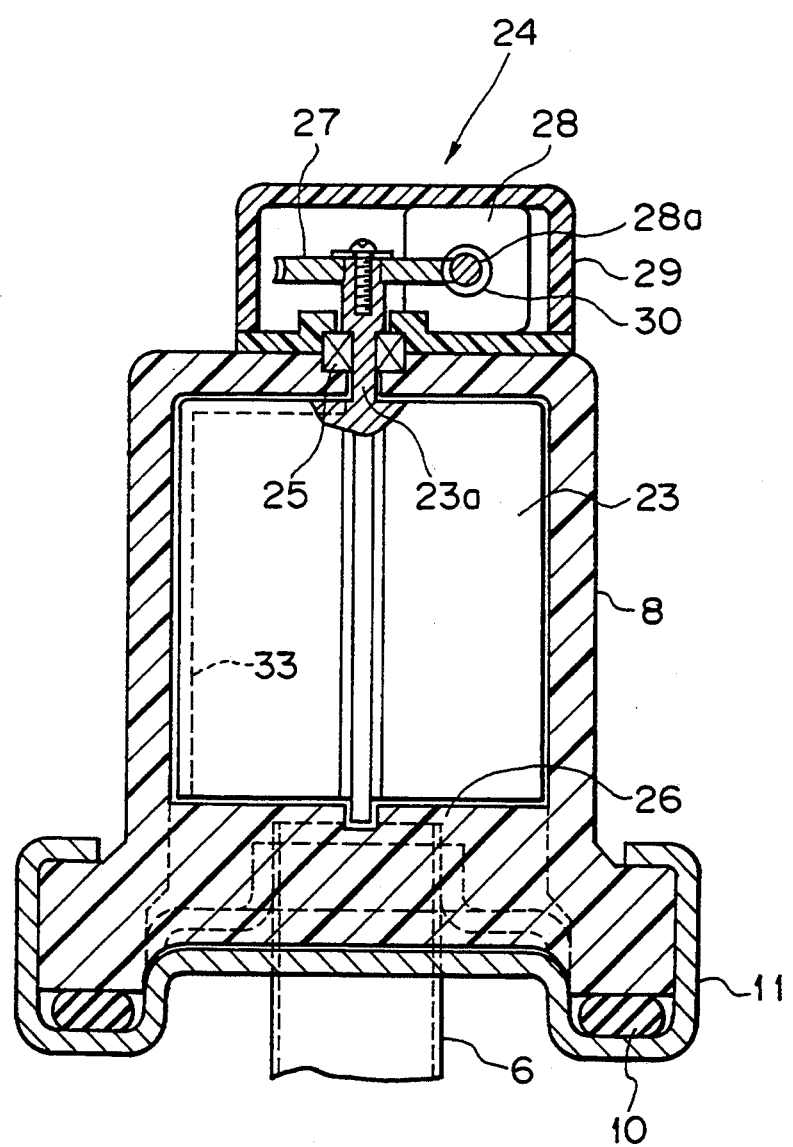
FIG. 3 is a cross-sectional view along line III—III of FIG. 2 according to the first embodiment.

The upper tank 8 and the lower tank 9 are fixed by caulking to a core plate 11 in which the ends of the tubes 6 are inserted through the packing 10 as shown in FIG. 3 (sectional view of upper tank side). Further, the upper tank 8 is provided with a pressure cap 12 for allowing the pressure to escape when the inside pressure of the radiator 5 rises above a set value.

The cooling water circuit of the engine 3 is constituted by an inlet pipe 13 connecting a water jacket (not shown) of an engine 3 and an upper tank 8 on the first radiator portion 7a, a return pipe 14 connecting the water jacket of the engine 3 and the lower tank 9 on the first radiator portion 7a side, and a bypass pipe 15 connecting the inlet pipe 13 and return pipe 14 going around the radiator 5.

The inlet pipe 13 is provided with a water temperature sensor 16 which detects the temperature of the cooling water flowing in the inlet pipe 13 (engine outlet water temperature). The cooling water temperature detected by the water temperature sensor 16 is output to the later-mentioned control apparatus 17 as the engine outlet water temperature signal Tw.

Figure 5:
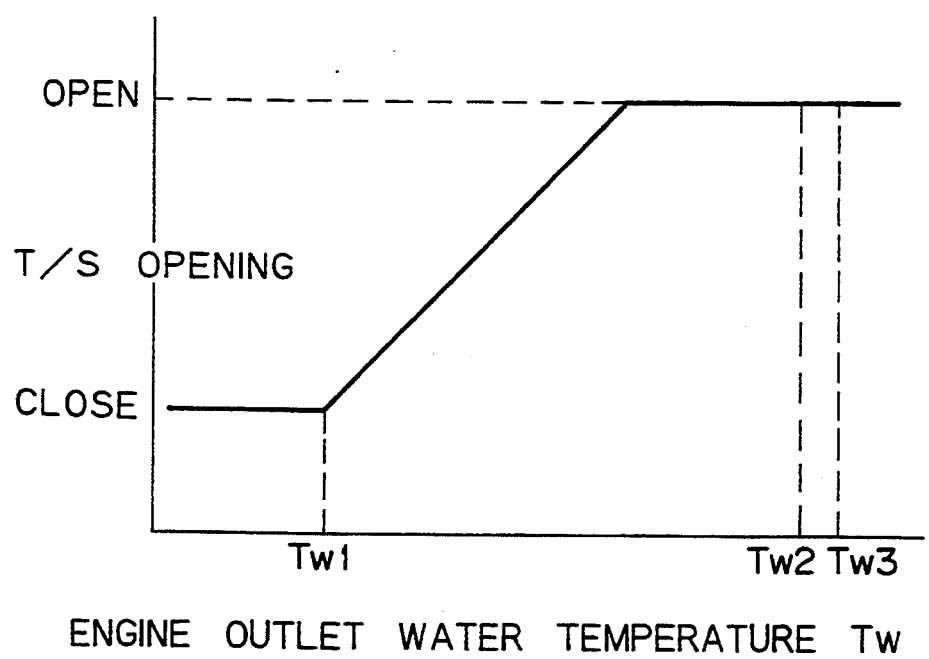
FIG. 5 is a graph showing the characteristics of a thermostat according to the first embodiment.

The connection portion between the bypass pipe 15 and the return pipe 14 is provided with a thermostat 18 for controlling the amount of flow of the cooling water to the radiator 5. The thermostat 18 can change the relative opening of the return pipe 14 side and the bypass pipe 15 side and increases the amount of flow of the cooling water to the radiator 5 along with an increase in the opening of the return pipe 14 side (that is, the opening on the bypass pipe 15 side becomes smaller). The opening of the thermostat 18 (opening of return pipe 14 side), as shown in FIG. 5, is changed so as to be completely closed when the engine outlet water temperature Tw is below a predetermined closed valve temperature Tw1 (for example, about 80° C.), to become larger in opening along with a subsequent rise in the cooling water temperature, and to become completely open at the predetermined open valve temperature (for example, about 90° C.).

The return pipe 14 is provided at a position downstream of the thermostat 18 (engine side) with a water pump 19 which is driven by the engine 3. The engine cooling water is made to flow in the cooling water circuit by the operation of this water pump 19.

The cooling water circuit of the intercooler 4 side is constituted by an inlet pipe 20 connecting the intercooler 4 and upper tank 8 of the second radiator portion 7b and the return pipe 21 connecting the intercooler 4 and the lower tank 9 of the second radiator portion 7b. The return pipe 21 is provided with a motor-driven water pump controlled by the control apparatus 17. The cooling water used for the intercooler 4 is made to flow through the cooling water circuit by the operation of the motor-driven water pump 22.

The above-mentioned switching means is constituted by a switching valve 23 provided in the upper tank and a drive apparatus 24 which drives the switching operation of the switching valve 23.

Figure 2:
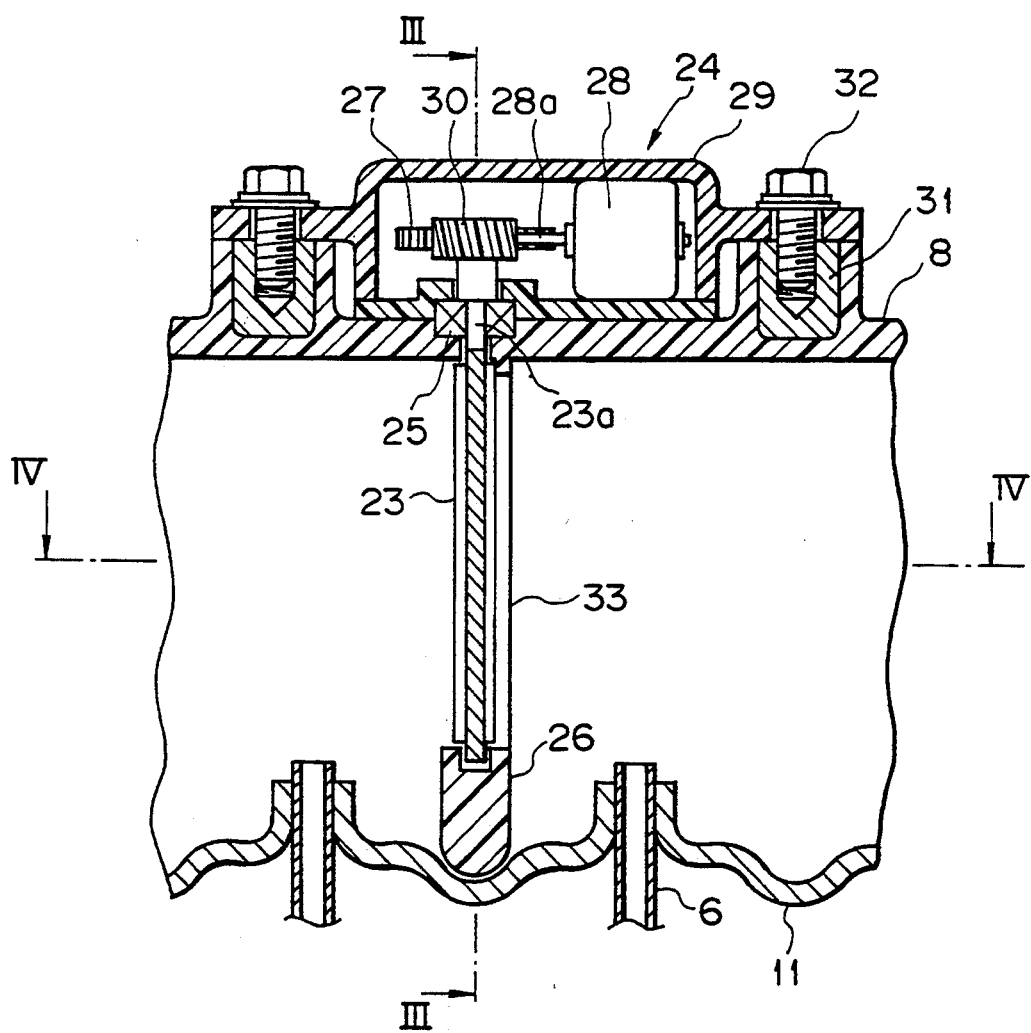
FIG. 2 is a cross-sectional view of the mounting structure of a switching valve and a drive apparatus according to the first embodiment of the present invention.
Figure 4:
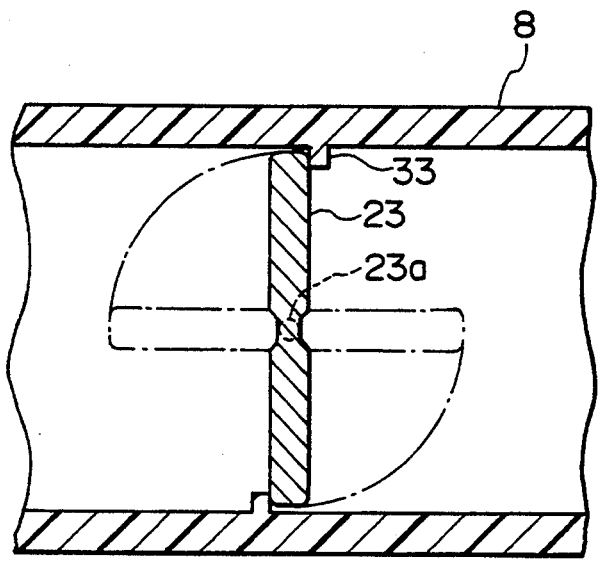
FIG. 4 is a cross-sectional view along line IV—IV of FIG. 2 according to the first embodiment.

The mounting structure of the switching means to the radiator 5 will be explained with reference to FIG. 2 to FIG. 4. FIG. 2 is a cross-sectional view showing the mounting structure of the switching valve 23 and the drive apparatus 24, FIG. 3 is a cross-sectional view along line III—III of FIG. 2, and FIG. 4 is a cross-sectional view along line IV—IV of FIG. 2.

The switching valve 23 is provided in the upper tank 8 and, as shown in FIG. 3, exhibits a rectangular plate-like shape corresponding to the sectional shape of the path of flow in the upper tank 8.

The top center and the bottom center of the switching valve 23 are provided with a rotary shaft 23a formed integral with the switching valve 23. The top side of the rotary shaft 23a is supported rotatably in the hole of the upper tank 8 via a sealing material 25, while the lower side of the rotary shaft 23a is supported rotatably in the hole of the support plate 26 formed integrally with the upper tank 8. Further, a gear wheel 27 is attached at the top end of the rotary shaft 23a.

The drive apparatus 24 is constituted by a servo motor 28 controlled by the control apparatus 17 and a motor case 29 accommodating the servo motor 28.

The rotary shaft 28a of the servo motor 28 has attached to it a gear wheel 30 engaging with the gear wheel 27. The rotational force of the servo motor 28 is transmitted to the rotary shaft 23a through the gear wheel 27 and the gear wheel 30.

The motor case 29 is affixed to the top of the upper tank 8 by fastening two bolts 32 to the insert nuts 31 (see FIG. 2) provided in the upper tank 8.

The switching valve 23 driven by the drive apparatus 24 is driven to rotate between a closed valve position (position shown by solid line in FIG. 4) and an open valve position (position shown by dot-chain line in FIG. 4) about the rotary shaft 23a.

The switching valve 23 driven to the closed valve position abuts against a pair of sealing plates 33 provided at the inside wall surface of the upper tank 8 (state shown in FIG. 4), whereby the inside of the upper tank 8 is split into one side (right side in FIG. 1) and another. The switching valve 23 driven to the open valve position connects one side of the upper tank 8 and the other side since the two outer circumferential ends of the switching valve 23 face the longitudinal direction in the upper tank 8.

Therefore, the switching valve 23 is driven to the closed valve position and the inside of the upper tank 8 is split into one side and the other, whereby the radiator portion 7 of the radiator 5 is also split into a first radiator portion 7a connected to one side of the upper tank 8 and a second radiator portion 7b connected to the other side of the upper tank 8. Note that the mounting position of the switching valve 23 is set so that the cooling capacity required for cooling the engine cooling water can be obtained under normal driving conditions even when just the first radiator portion 7a is used.

The control apparatus 17 outputs a control signal to the servo motor 28 and the motor-driven water pump 22 based on the information from the water temperature sensor 16 and the throttle position sensor 34 which detects the idling state of the engine.

Next, the operation of the present embodiment will be explained based on the processing routine of the control apparatus 17.

Figure 6:
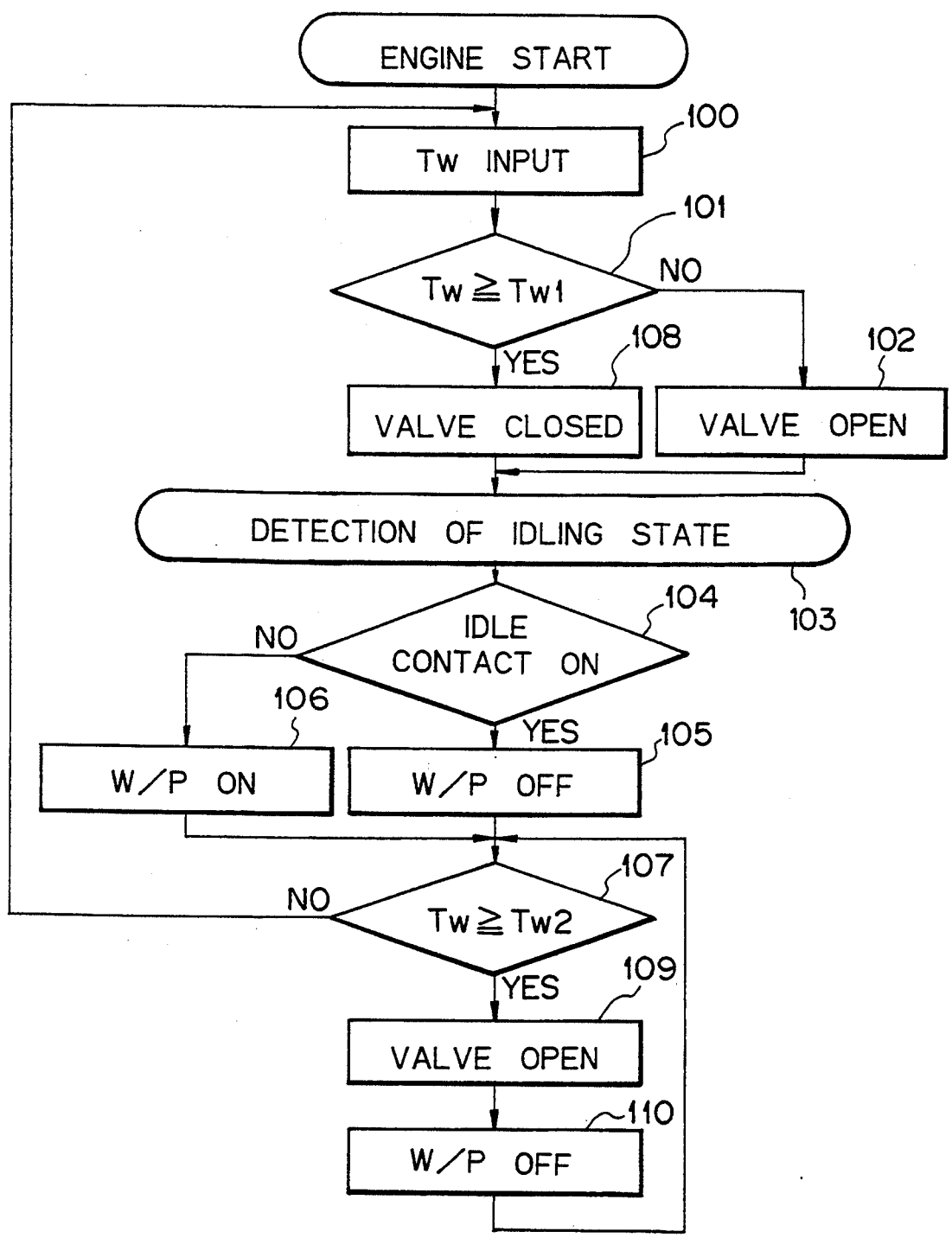
FIG. 6 is a flow chart of the processing routine of a control apparatus according to the first embodiment.

FIG. 6 is a flow chart of the processing routine of the control apparatus 17.

After the start of the engine 3, the engine outlet water temperature signal Tw is input (step 100).

Next, it is determined if the input engine outlet water temperature signal Tw is higher than a first set value Tw1 corresponding to the cooling water temperature (80° C.) at the time when the thermostat 18 starts to open (step 101). Here, when the engine cooling water temperature is a low water temperature of less than 80° C. (during engine warmup), the thermostat 18 is closed, so the engine cooling water flows through the bypass pipe 15 without being led to the radiator 5 and is returned to the engine 3 once again. Therefore, at step 101, when the engine outlet water temperature Tw is smaller than the first set value Tw1 (NO), the entire area of the radiator 5 is used as the intercooler 4, so a control signal is output to the servo motor 28 so that the switching valve 23 becomes the open valve position (step 102).

Next, the idling state of the engine is detected (step 103). Specifically, it is determined by the throttle position sensor 34 if the idle contact is ON or not (step 104).

When the engine is in the idling state, that is, when the idle contact is ON (YES), the supercharger 2 does not operate, so there is no need for cooling the cooling water for the intercooler 4. Therefore, in this case, the operation of the motor-driven water pump 22 is stopped (step 105) so as to save power.

When the vehicle is running, that is, when the idle contact is not ON (NO), a control signal is output for making the motor-driven water pump 22 operate (step 106). This enables the cooling water for the intercooler 4 to be cooled efficiently using the entire area of the radiator 5. The flow of the cooling water at the time of a low water temperature (case of operation of the motor-driven water pump 22) is shown by the thin broken arrow marks in FIG. 1.

Next, it is determined if the engine outlet water temperature signal Tw is over a second set value Tw2 corresponding to the cooling water temperature just before the overheat limit water temperature (for example, 103° C.) (step 107). When the engine outlet water temperature signal Tw is smaller than the second set value Tw2 (NO), the control starting from step 100 is repeated.

After this, the thermostat 18 is opened along with the rise of the temperature of the engine cooling water. When the engine outlet water temperature signal Tw is higher than the first set value Tw1 at step 101, that is, when the cooling water temperature is an intermediate water temperature of from 80° C. to less than 103° C. (ordinary operation), a control signal is output to the servo motor 28 so that the switching valve 23 becomes the closed valve position (step 108). By this, the radiator 5 is split between the first radiator portion 7a and the second radiator portion 7b. The first radiator portion 7a may be used for cooling the engine 3 and the second radiator portion 7b may be used for cooling the intercooler 4. Even at this intermediate water temperature, when it is determined at step 104 that the engine is in an idling state, the operation of the motor-driven water pump 22 is stopped (step 105). When it is determined that it is in the running state, the motor-driven water pump 22 is made to operate (step 106). The flow of the cooling water at the time of this intermediate water temperature (case where the motor-driven water pump 22 is made to operate) is shown by the thin solid arrow marks in FIG. 1.

At step 107, when the engine outlet water temperature signal Tw is higher than the second set value Tw2 (YES), that is, when the cooling water temperature is a high water temperature of more than 103° C. (during emergency), a control signal is output to the servo motor 28 so that the switching valve 23 becomes the open valve position (step 109) and a control signal is output to stop the operation of the motor-driven water pump 22 (step 110). This enables the entire area of the radiator 5 to be used for cooling the engine 3 and enables the water capacity of the second radiator portion 7b of the relatively low temperature to be made use of, so the cooling capacity of the radiator 5 is improved and the engine outlet water temperature is effectively reduced. The flow of the cooling water at the time of a high water temperature is shown by the thick solid arrow marks in FIG. 1.

In this case, no improvement in the output of the engine 3 can be hoped for due to the circulation of water to the intercooler 4 being stopped, but under such large thermal load conditions, an improvement of the engine output is not necessary, so this does not pose any particular problem.

After this, the routine returns to step 107. When the engine outlet water temperature signal Tw becomes smaller than a second set value Tw2, the above-mentioned 10 routine is repeated.

Note that at the above step 105, control is exercised to stop the operation of the motor-driven water pump 22 since the engine is in the idling state, but even in the idling state, the motor-driven water pump 22 may be operated and the cooling action performed.

In this embodiment, the motor-driven water pump 22 is operated by ON/OFF control, but by changing from ON/OFF control to variable volume control, it is of course possible to raise the efficiency of use (for example, improve the power saving effect).

The method for detecting the idling state of the engine used here was to determine if the idling contact was ON by the throttle position sensor 34 (step 104), but it is also possible to predict in advance the engine load in accordance with the engine rotational speed and the throttle opening and determine the idling state from the engine rotational speed detected by the engine rotational speed sensor 35.

In the present embodiment, the radiator 5 was made divisible into the first radiator portion 7a and the second radiator portion 7b, but it is also possible to divide it into three or more radiator portions.

Next, a second embodiment of the present invention will be explained.

Figure 7:
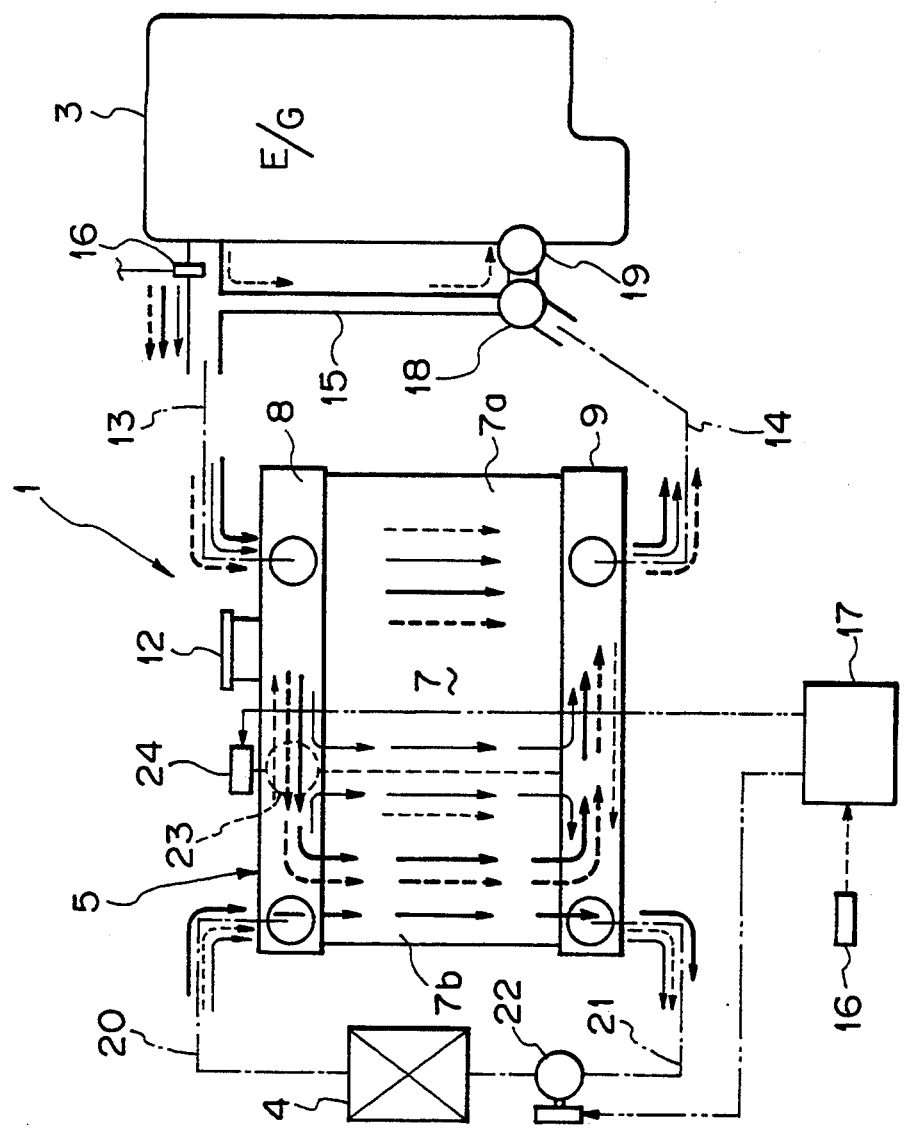
FIG. 7 is a view of the general structure of the vehicular use cooling apparatus according to a second embodiment.

FIG. 7 is a view of the general structure of the vehicular use cooling apparatus according to the second embodiment.

In this embodiment, the motor-driven water pump 22 is made to operate when the engine outlet water temperature signal Tw is higher than the second set value Tw2. Its capacity is changed to control the engine outlet water temperature.

Figure 8:
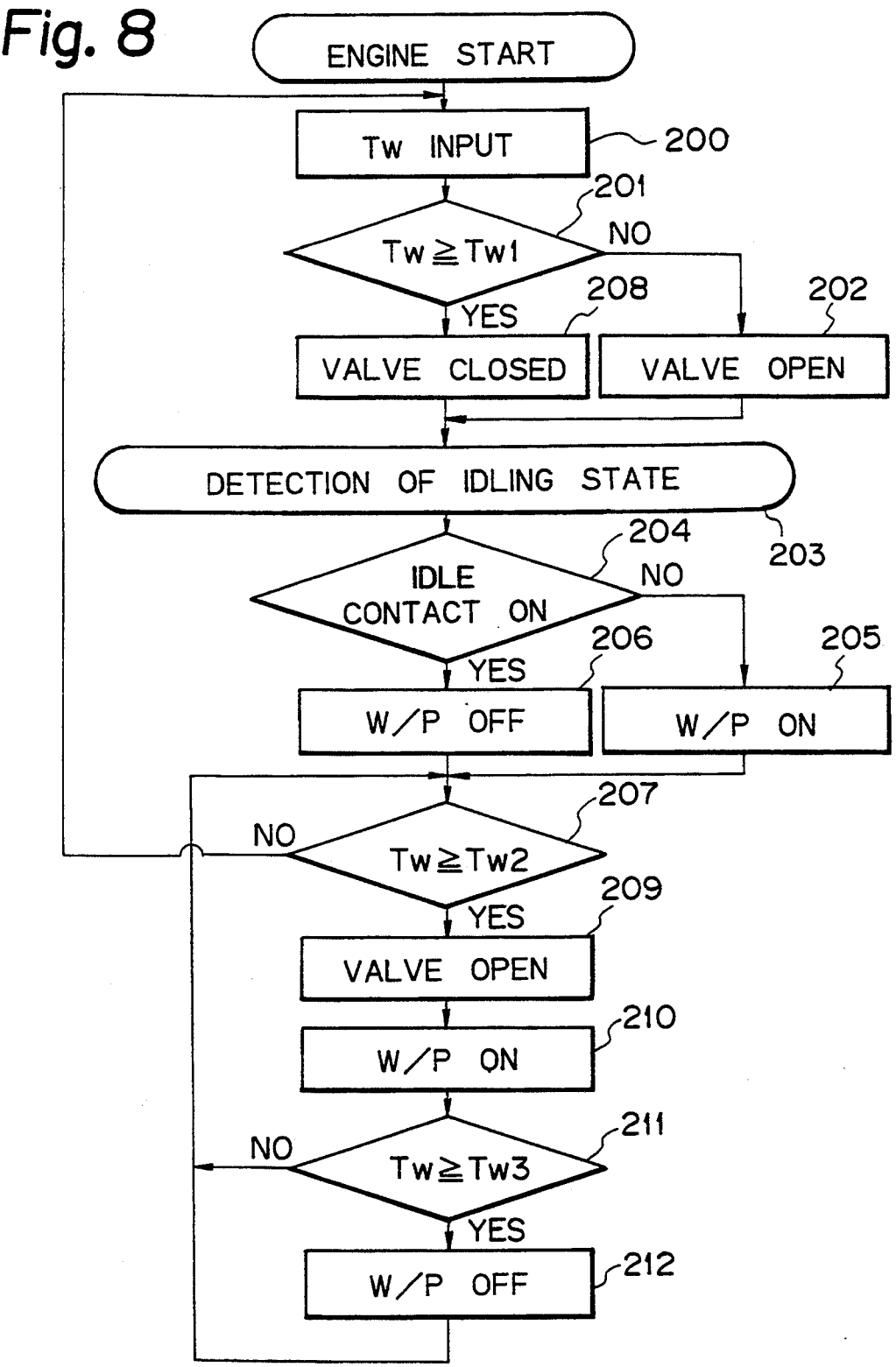
FIG. 8 is a flow chart of the processing routine of the control apparatus according to the second embodiment.

The operation of the present embodiment will be explained based on the flow chart shown in FIG. 8.

Note that the processing from step 200 to step 209 of the flow chart is the same as the processing from step 100 to step 109 of the flow chart of the first embodiment shown in FIG. 6, so an explanation will be omitted.

At step 207, when the engine outlet water temperature signal Tw is higher than the second set value Tw2 (YES), that is, the cooling water temperature is a high water temperature of over 103° C. (during emergency), a control signal is output to the servo motor 28 so that the switching valve 23 becomes the open valve position (step 209) and a control signal is output for making the motor-driven water pump 22 operate (step 210).

In this case, the radiator 5 is split and both the first radiator portion 7a and the second radiator portion 7b function, but the amount of flow of the cooling water flowing through the first radiator portion 7a due to the water pump 19 driven by the engine 3 and the amount of flow of the cooling water flowing through the second radiator portion 7b due to the motor-driven water pump 22 are balanced by the flow characteristics of the water pumps 19 and 22 and resistance of the water passage systems.

That is, even if the rotational speed of the water pump 19 driven by the engine 3 is constant, by improving the capacity of the motor-driven water pump 22, the amount of water passage of the second radiator portion 7b is increased and the amount of water passage of the first radiator portion 7a is lowered.

Therefore, by changing the capacity of the motor-driven water pump 22, it becomes possible to control the engine outlet water temperature. The flow of the cooling water when operating the motor-driven water pump 22 at the time of a high water temperature is shown by the thick solid arrow marks in FIG. 7, while the flow of the cooling water in the case of stopping the motor-driven water pump 22 is shown by the thick broken arrow marks in FIG. 7. Note that the flows of the cooling water at the time of a low water temperature and an intermediate water temperature are shown by the thin broken arrow marks and the thin solid arrow marks in the same way as the first embodiment.

After this, when the engine outlet water temperature rises and the engine outlet water temperature signal Tw rises over the third set value Tw3 corresponding to the overheat limit water temperature (for example, 110° C.) (YES at step 211), in the same way as the first embodiment, a control signal for stopping the operation of the motor-driven water pump 22 is output (step 212) and the entire area of the radiator 5 is used for cooling the engine. Note that when the engine outlet water temperatures Tw is smaller than the third set value Tw3 at step 211 (NO), that is, when the engine outlet water temperature is less than 110° C., the routine returns to step 207.

Next, a third embodiment of the present invention will be explained.

Figure 9:
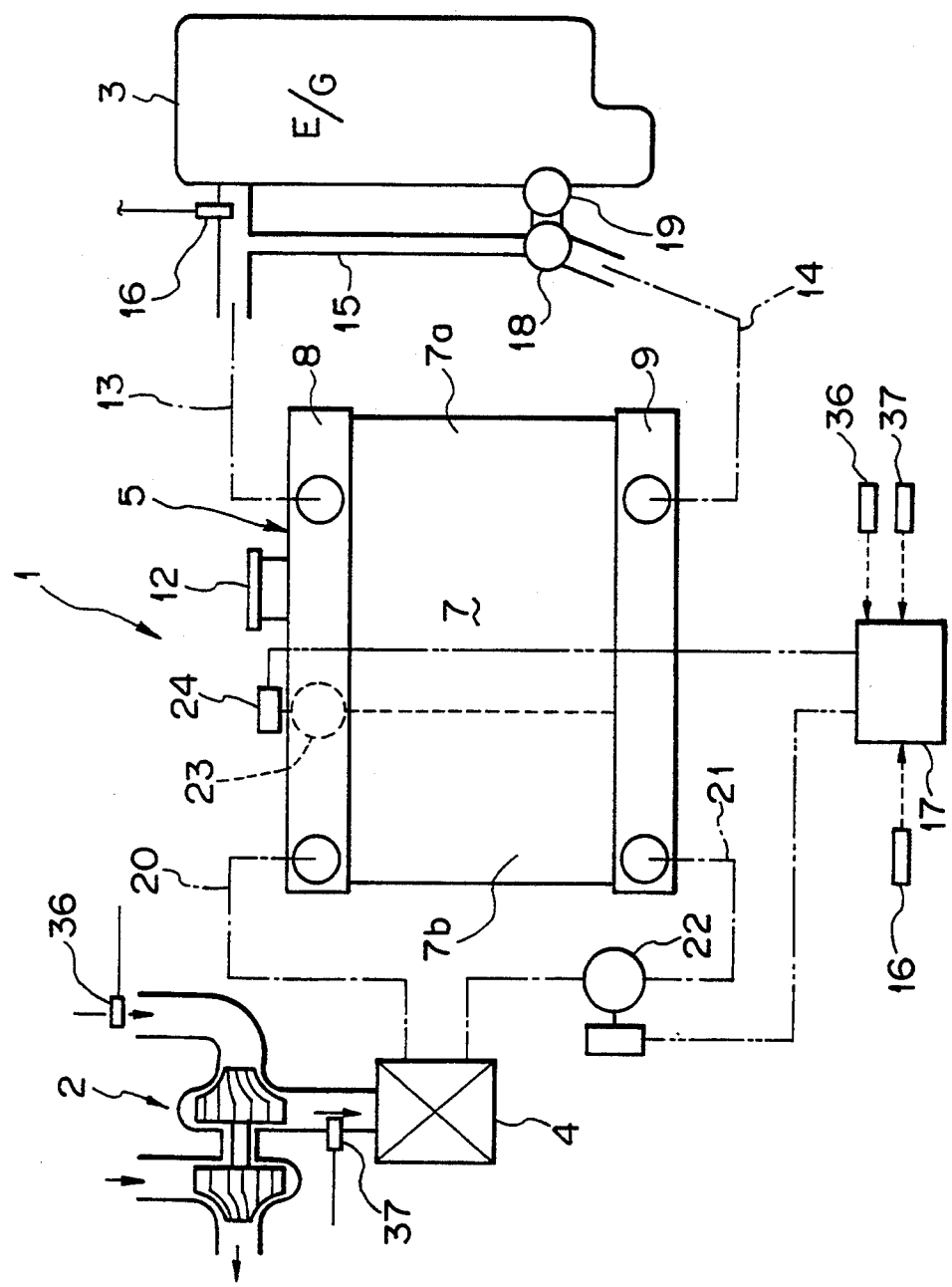
FIG. 9 is a view of the general structure of the vehicular use cooling apparatus according to a third embodiment.

FIG. 9 is a view of the general structure of the vehicular use cooling apparatus according to the third embodiment.

The vehicular use cooling apparatus i of the present embodiment is provided with an outside air temperature sensor 36 for detecting the temperature of the outside air and an intake temperature sensor 37 for detecting the temperature of the intake air of the intercooler 4 and adds to the content of the control shown in the first embodiment control based on the outside air temperature signal Ta from the outside air temperature sensor 36 and the intake temperature signal Tc from the intake temperature sensor 37.

Figure 10:
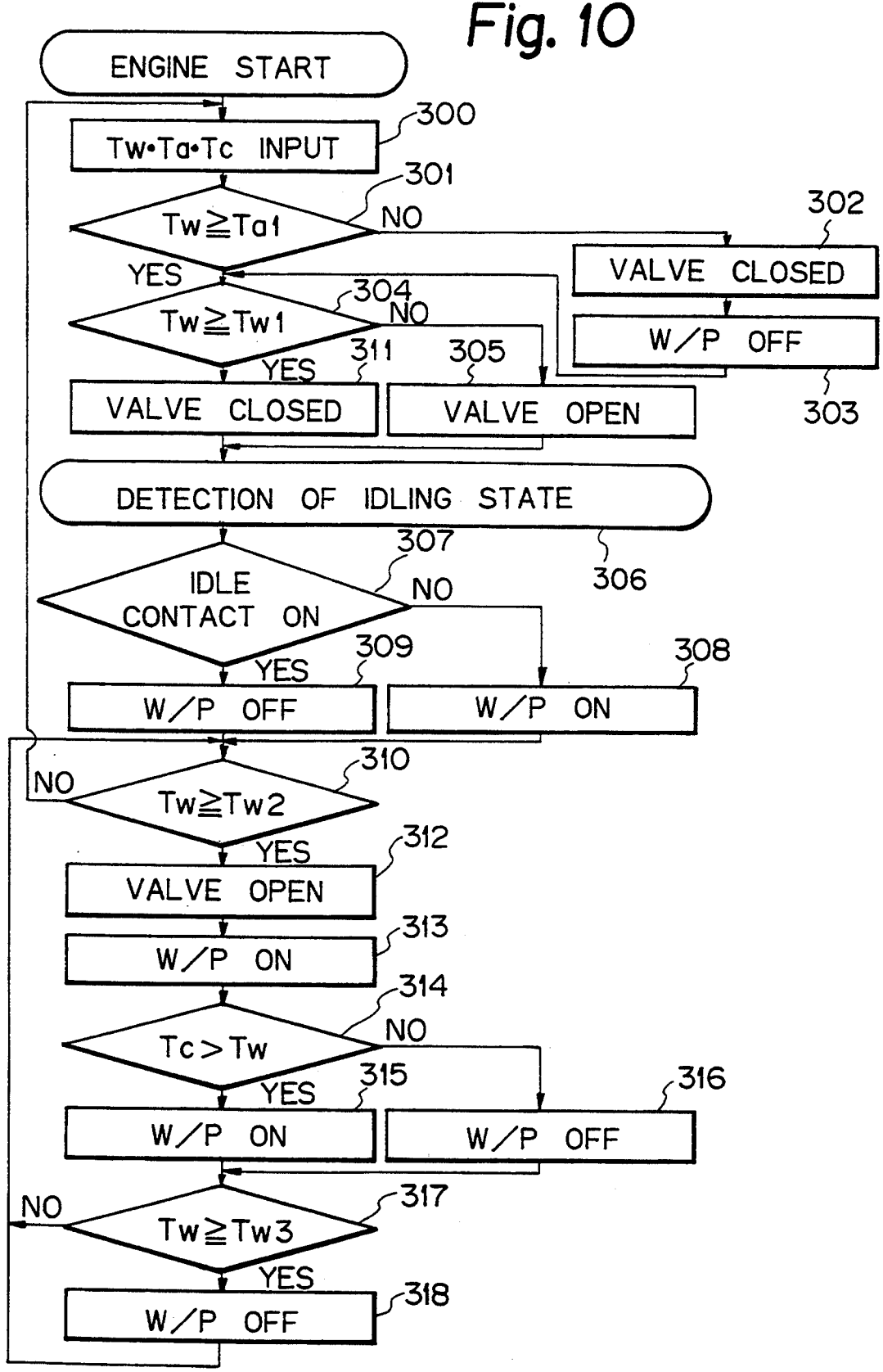
FIG. 10 is a flow chart of the processing routine of the control apparatus according to the third embodiment.

Below, an explanation will be given of the operation relating to the control based on the outside air temperature signal Ta and the intake temperature signal Tc based on the flow chart shown in FIG. 10.

When the outside air temperature is extremely low and therefore the intake temperature also becomes lower, there is no need for supplying cooling water to the intercooler 4, so when the outside air temperature signal Ta input at step 300 is smaller than the set temperature Ta1 (NO at step 301), a control signal is output to the servo motor 28 so that the switching valve 23 enters the closed valve position (step 302) and a control signal is output to stop the operation of the motor-driven water pump 22 (step 303). As a result, it is possible to save a larger amount of power.

The processing from step 304 to step 313 is the same as the processing from step 201 to step 210 of the flow chart shown in the second embodiment, so an explanation thereof will be omitted.

After the processing of step 313 is executed, the intake temperature signal Tc from the intake temperature sensor 37 disposed in front of the intercooler 4 is compared with the engine outlet water temperature signal Tw. When the intake temperature signal Tc is higher than even the engine outlet water temperatures Tw (YES at step 314), a control signal is output to operate the motor-driven water pump 22 to cool the intake air (step 315). Conversely, when the intake temperature signal Tc is smaller than the engine outlet water temperatures Tw (NO at step 314), a control signal is output to stop the operation of the motor-driven water pump 22 (step 316). When the intake temperature is lower than the engine outlet water temperature, the temperature of the intake air passing through the intercooler 4 conversely rises due to heat exchange with the cooling water, so the rise of the intake temperature can be prevented by stopping the motor-driven water pump 22.

When the engine outlet water temperature further rises and the engine outlet water temperatures Tw rises above a third set value Tw3 corresponding to the overheat limit water temperature (for example, 110° C.) (YES at step 317), a control signal is output to stop the operation of the motor-driven water pump 22 (step 318).

Next, an explanation will be made of a fourth embodiment of the present invention.

Figure 11:
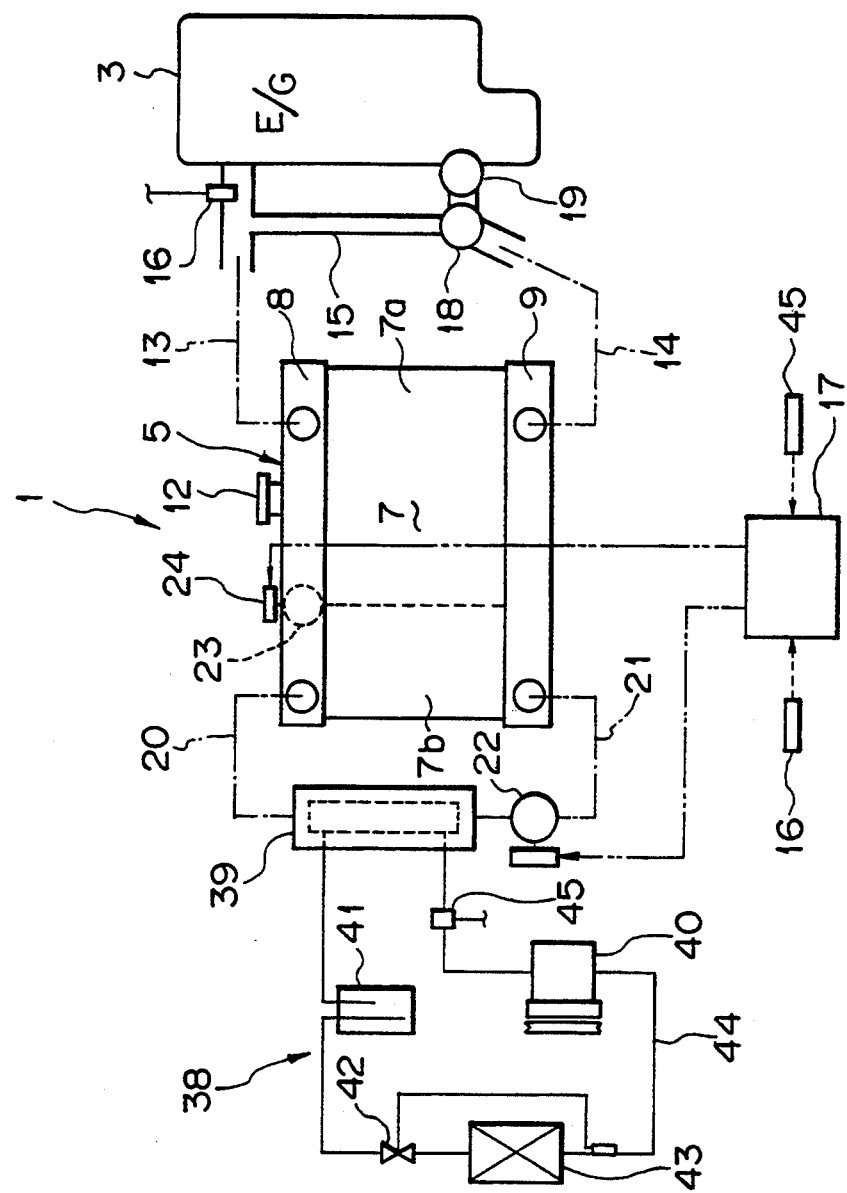
FIG. 11 is a view of the general structure of the vehicular use cooling apparatus according to a fourth embodiment.

FIG. 11 is a view of the general structure of the vehicular use cooling apparatus according to the fourth embodiment.

The present embodiment is provided with a water-cooled refrigerant condenser 39 which cools all or part of a refrigerant condenser constituting part of the refrigeration cycle 38. The second radiator portion 7b of the radiator 5 is used for the water-cooled refrigerant condenser 39. Note that the refrigeration cycle 38 includes in addition to the refrigerant condenser 39 a refrigerant compressor 40, a receiver 41, a pressure reduction apparatus 42, and a refrigerant evaporator 43. It has a well known structure connected annularly by the refrigerant piping 44.

The high pressure side refrigerant piping 44 of the refrigeration cycle 38 (in this embodiment, between the refrigerant compressor 40 and the water-cooled refrigerant condenser 39) is provided with a high pressure sensor 45 for detecting the high pressure and outputs an air-conditioner high pressure signal to the control apparatus 17. The control apparatus 17 uses this air-conditioner high pressure signal as a control factor and thereby controls the switching operation of the switching valve 23 and the ON/OFF state and capacity of the motor-driven water pump 22 etc.

Next, an explanation will be made of a fifth embodiment of the present invention.

Figure 12:
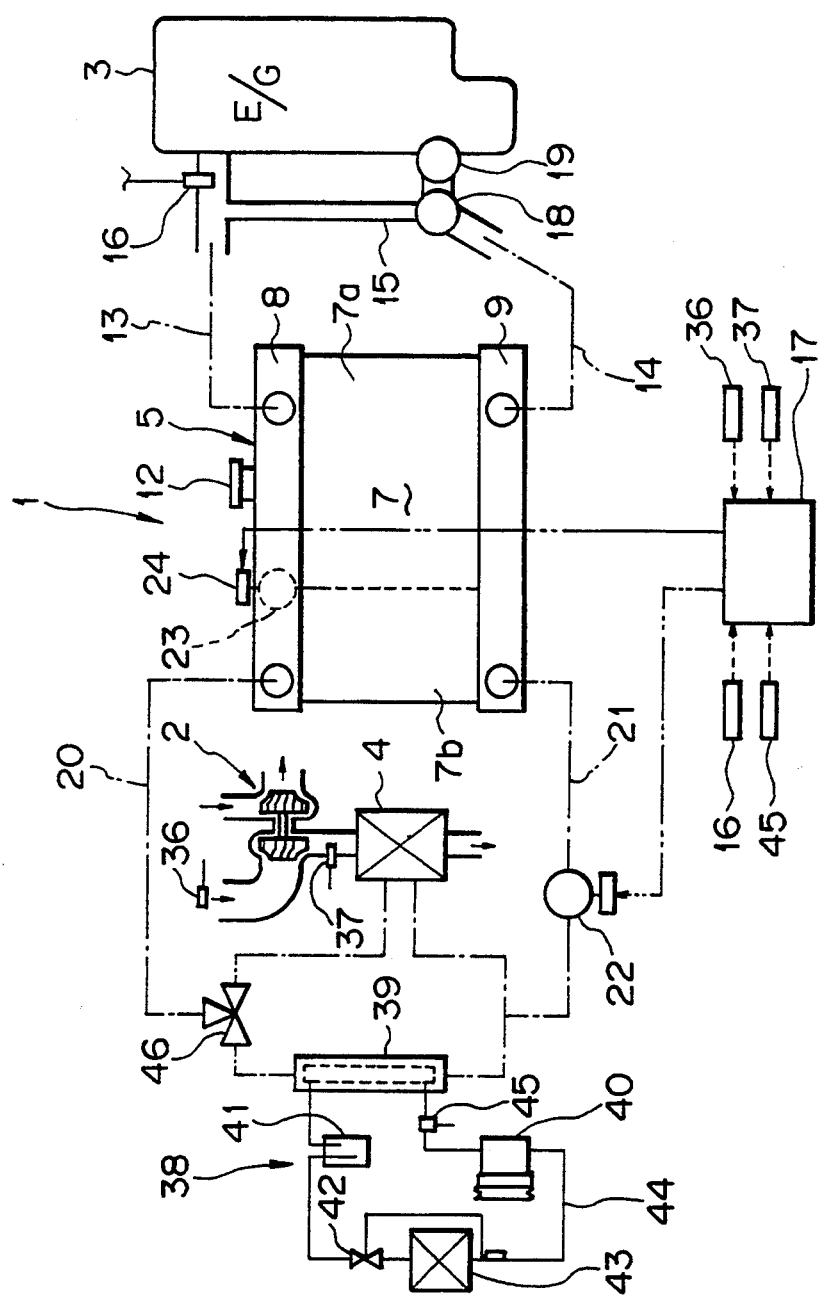
FIG. 12 is a view of the general structure of the vehicular use cooling apparatus according to a fifth embodiment.

FIG. 12 is a view of the general structure of the vehicular use cooling apparatus according to the fifth embodiment.

The present embodiment uses the second radiator portion 7b of the radiator 5 for the common cooling system of the water-cooled intercooler 4 and the water-cooled refrigerant condenser 39. The branch portion of the cooling water circuit of the water-cooled intercooler 4 and the cooling water circuit of the water-cooled refrigerant condenser 39 is provided with a flow control valve 46. The control apparatus 17 controls the flow control valve 46 and the capacity of the motor-driven water pump 22 so as to obtain a cooling water flow commensurate with the cooling performance required by the water-cooled intercooler 4 and the water-cooled refrigerant condenser 39.

Note that of course it is possible to control just the capacity of the motor-driven water pump 22 without providing the flow control valve 46.

Next, an explanation will be given of a sixth embodiment of the present invention.

Figure 13:
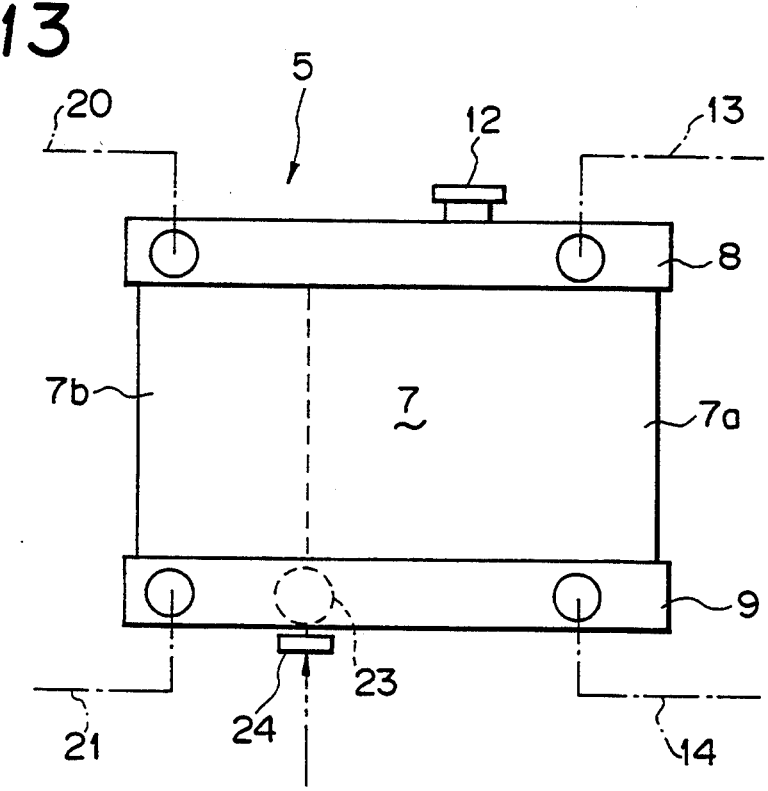
FIG. 13 is a view of the general structure of the vehicular use cooling apparatus according to a sixth embodiment.

FIG. 13 is a view of the general structure of the vehicular use cooling apparatus according to the sixth embodiment.

In the present embodiment, a switching means is provided at the lower tank 9 side. A switching valve 23 is disposed in the lower tank 9 and a drive apparatus 24 is provided at the bottom portion side of the lower tank 9.

In the case of this embodiment as well, it is possible to obtain a similar effect as with the first embodiment wherein a switching means is provided at the upper tank 8 side.

Therefore, the switching means can select either the upper tank 8 side or the lower tank 9 side in accordance with the installation space in the vehicle.

Next, an explanation will be given of a seventh embodiment of the present invention.

Figure 14:
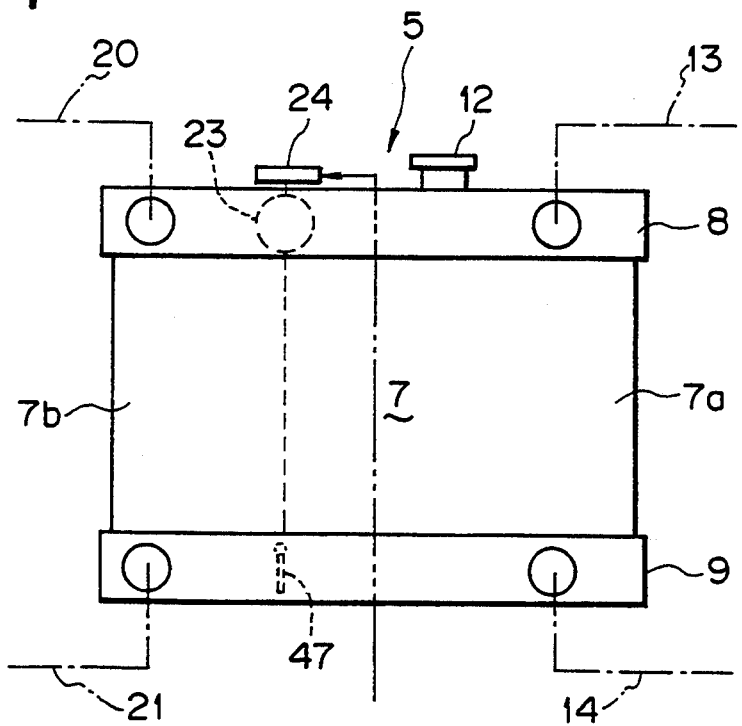
FIG. 14 is a view of the general structure of the vehicular use cooling apparatus according to a seventh embodiment.

FIG. 14 is a view of the general structure of the vehicular use cooling apparatus according to the seventh embodiment.

In this embodiment, the switching means is provided at the upper tank 8 side, and a switching valve 47 which operates by the pressure difference between the first radiator portion 7a and the second radiator portion 7b is provided in the lower tank 9.

Figure 15:
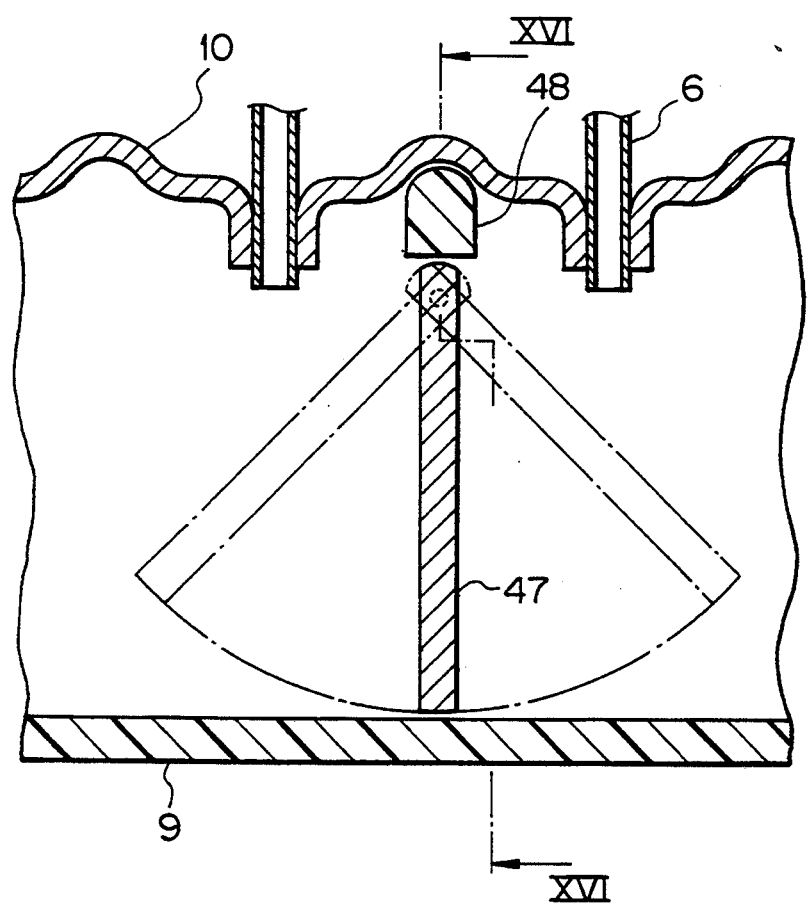
FIG. 15 is a cross-sectional view of the mounting structure of the switching valve according to the seventh embodiment.
Figure 16:
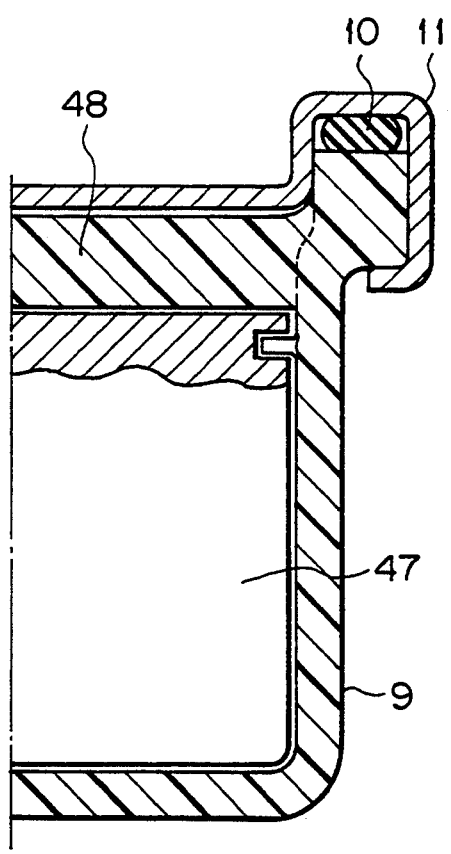
FIG. 16 is a cross-sectional view along line XVI—XVI of FIG. 15 according to the seventh embodiment.

The switching valve 47 has one end rotatably supported at the support plate 48 in the lower tank 9 and has the other end free as shown in FIG. 15 (cross-sectional view showing mounting structure of switching valve 47) and FIG. 16 (cross-sectional view along line XVI—XVI of FIG. 15).

By providing the switching valve 47 in the lower tank 9, when the switching valve 23 in the upper tank 8 is in the closed valve position and the radiator 5 is used split into the first radiator portion 7a and the second radiator portion 7b, it is possible to prevent heat transfer due to contact with the cooling water used at the first radiator portion 7a side and the second radiator portion 7b side in the lower tank 9.

Further, when the switching valve 23 in the upper tank 8 is in the open valve position and the entire area of the radiator 5 is used for a single cooling system (for example, when used for cooling the engine at the time of a high water temperature), the switching valve 47 in the lower tank 9 opens to the first radiator portion 7a side (right side in FIG. 15) by the pressure difference between the first radiator portion 7a side and the second radiator portion 7b side.

Note that even if the switching valve 47 is provided in the lower tank 9, the switching valve 47 is freely openable and closable, so there is no need for separately providing a water inlet or drain cock for water discharge for the first radiator portion 7a and the second radiator portion 7b. The same structure as in the past is enough.

Further, the switching valve 47 in the lower tank 9 may be provided to be drive to operate by a drive apparatus (not shown) in the same way as the switching valve 23 in the upper tank 8.

Next, an eighth embodiment of the present invention will be explained.

Figure 17:
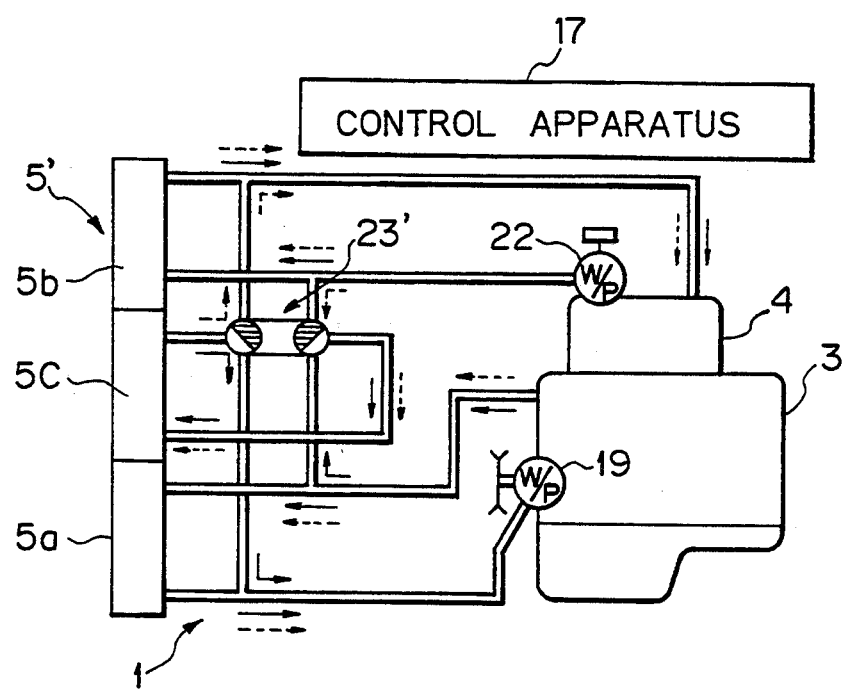
FIG. 17 is a view of the general structure of a vehicular use cooling apparatus according to an eighth embodiment.
Figure 18:
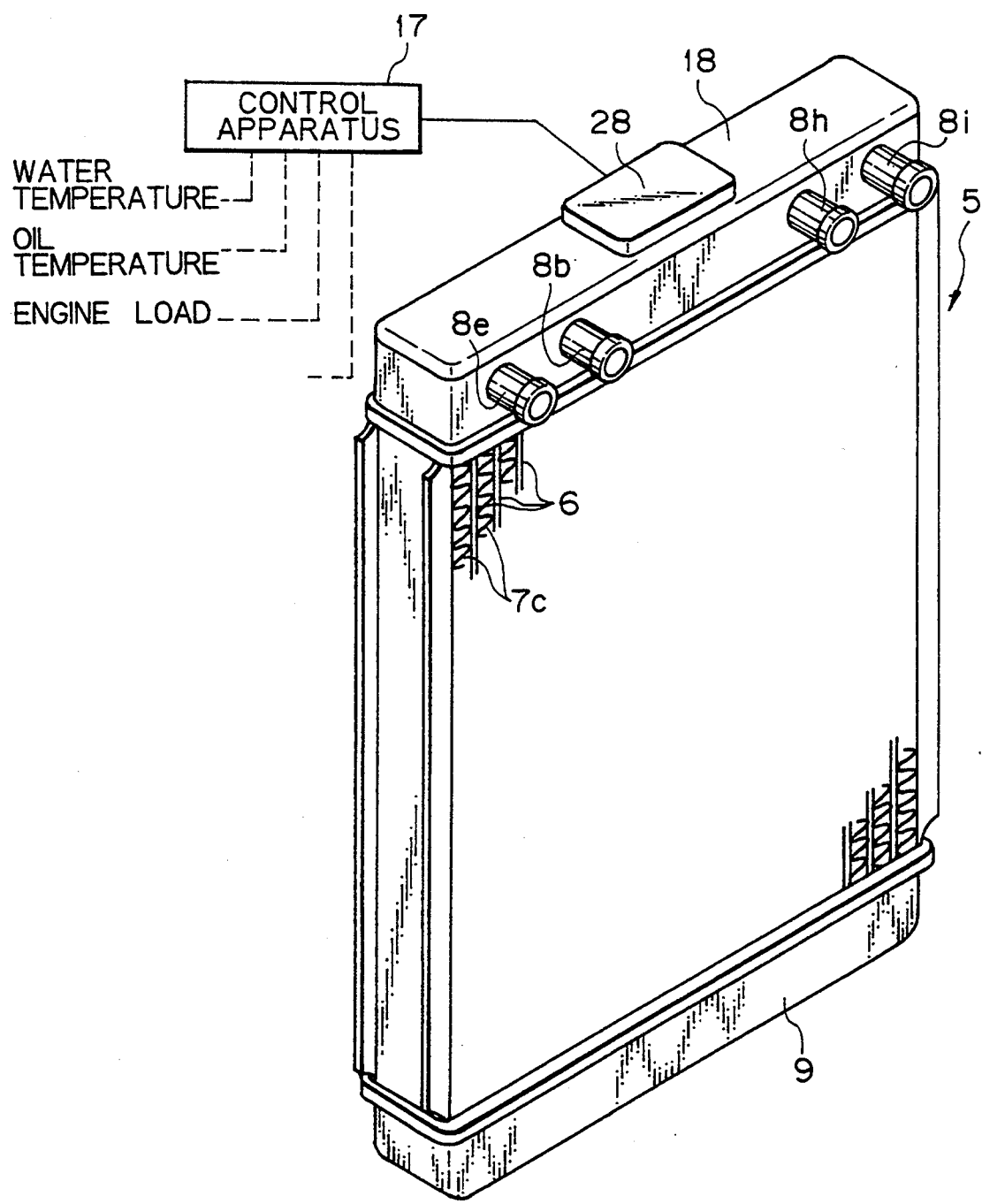
FIG. 18 is a perspective view of a composite radiator according to the eighth embodiment.
Figure 19:
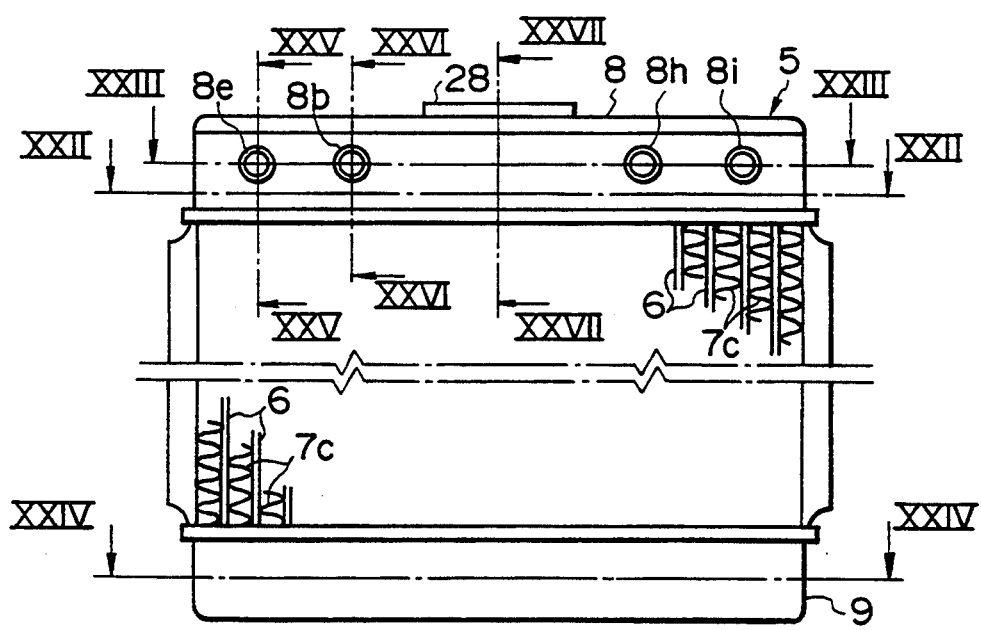
FIG. 19 is a front view of the composite radiator according to the eighth embodiment.
Figure 20:
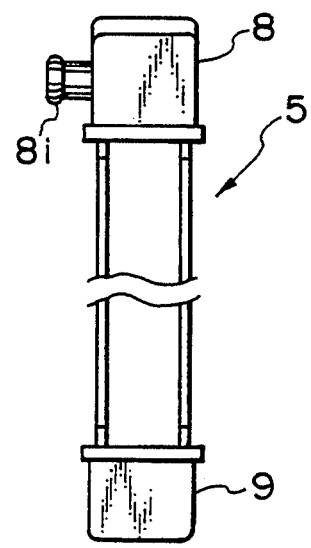
FIG. 20 is a side view of the composite radiator according to the eighth embodiment.
Figure 21:
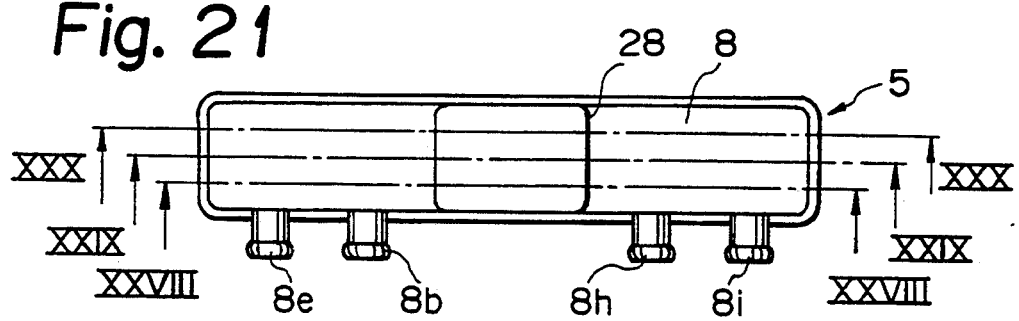
FIG. 21 is a top view of the composite radiator according to the eighth embodiment.
Figure 22:
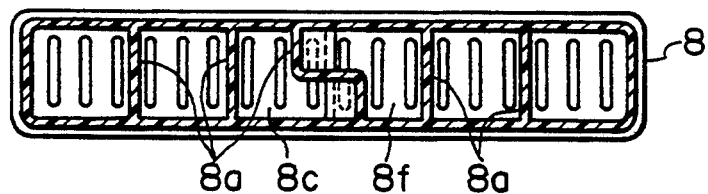
FIG. 22 is a cross-sectional view along line XXII—XXII of FIG. 19 according to the eighth embodiment.

FIG. 17 is a view of the general structure of a vehicular use cooling apparatus according to the eighth embodiment.

The vehicular use cooling apparatus 1 of the present embodiment is an apparatus which dissipates the heat from and thus cools the cooling water of a water-cooled internal combustion engine 3 equipped with a supercharger for powering a vehicle and the cooling water of a water-cooled intercooler 4 (one example of water-cooled cooling system) for cooling the air compressed by the supercharger. The cooling water for cooling the internal combustion engine 3 has its heat discharged by the first radiator 5a. The capacity of the first radiator 5a is designed to be sufficient for normal operation of the vehicle. In the water-cooled intercooler 4, further, the cooling water for cooling the intake air has its heat dissipated by the second radiator 5a. The capacity of the second radiator 5b is preferably large, but is designed to be suitable from the viewpoints of weight and cost. Note that the cooling water of the internal combustion engine 3 and the cooling water of the intercooler 4 are circulated by water pumps 19, 22 provided for the same.

The first radiator 5a and the second radiator 5b are provided as an integral composite radiator 5' sandwiching between them a third radiator 5c having independent cooling water lines. The volume of the third radiator 5c is added to the volume of the first radiator 5a when the internal combustion engine is operated in an overloaded state and is set to a volume not causing overheating. Further, the third radiator 5c is provided so as to be able to be switched and supplied with the cooling water of the internal combustion engine 3 and the cooling water of the water-cooled intercooler 4. The switching is performed by the switching means 23'. Specifically, the third radiator 5c is provided to be able to be connected in parallel with the first radiator 5a or the second radiator 5b. The third radiator 5c is connected in parallel with the first radiator 5a or the second radiator 5b in accordance with the switching state of the switching means 23'.

The composite radiator 5' which integrally constitutes the first, second, and third radiators 5a, 5b, and 5c, as shown from FIG. 18 to FIG. 30, is a laminated type heat exchanger provided with tubes 6 and corrugated fins 7c in a laminated state, with an upper tank 8 and a lower tank 9 provided at the two ends of the tubes 6. The cooling water paths formed by the tubes 6 are provided divided into three groups: those for the first radiator 5a, for the second radiator 5b, and for the third radiator 5c, by the partition walls 8a provided at the upper tank 8 and the lower tank 9.

Figure 31:
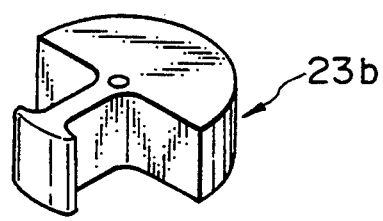
FIG. 31 is a perspective view of a valve of the switching means according to the eighth embodiment.
Figure 32:
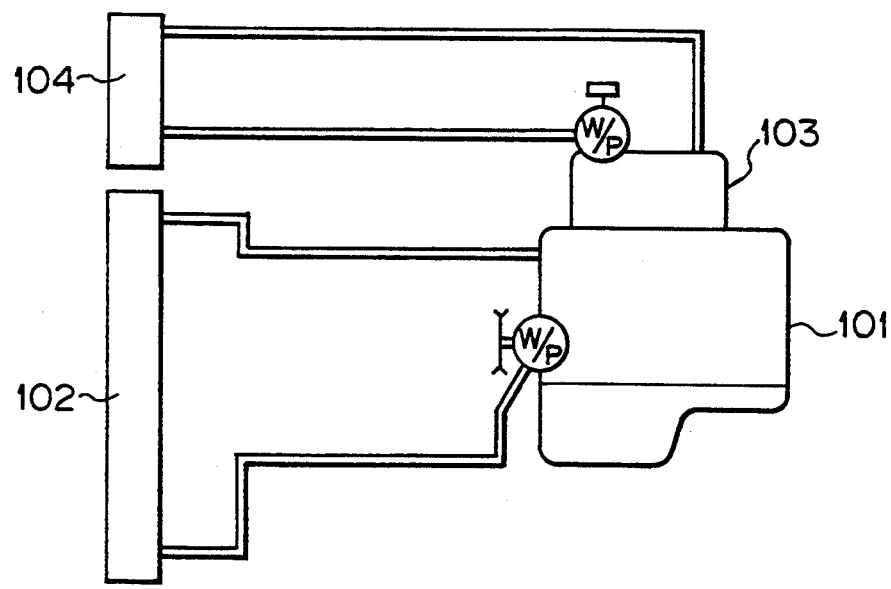
FIG. 32 is a view of the general structure of the vehicular use cooling apparatus.

The switching of the cooling water of the third radiator 5c is performed by the switching means 23' provided in the upper tank 8. The switching means 23' is provided with a valve 23b shown in FIG. 31 and a servo motor 28 for driving the rotation of the valve 23b. The servo motor 28 is controlled in conduction by the control apparatus 17.

Figure 23:
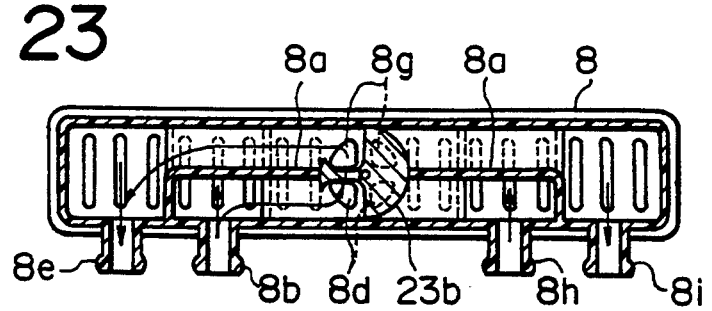
FIG. 23 is a cross-sectional view along line XXIII—XXIII of FIG. 19 according to the eighth embodiment.
Figure 24:
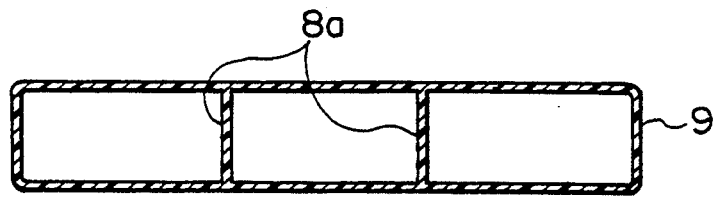
FIG. 24 is a cross-sectional view along line XXIV—XXIV of FIG. 19 according to the eighth embodiment.
Figure 25:
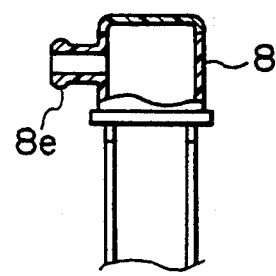
FIG. 25 is a cross-sectional view along line XXV—XXV of FIG. 19 according to the eighth embodiment.
Figure 26:
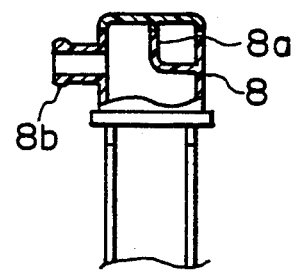
FIG. 26 is a cross-sectional view along line XXVI—XXVI of FIG. 19 according to the eighth embodiment.
Figure 27:
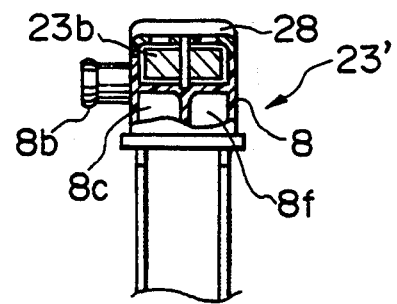
FIG. 27 is a cross-sectional view along line XXVII—XXVII of FIG. 19 according to the eighth embodiment.
Figure 28:
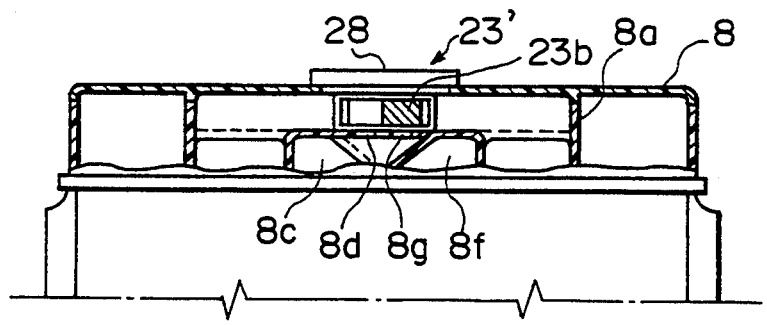
FIG. 28 is a cross-sectional view along line XXVIII—XXVIII of FIG. 21 according to the eighth embodiment.
Figure 29:
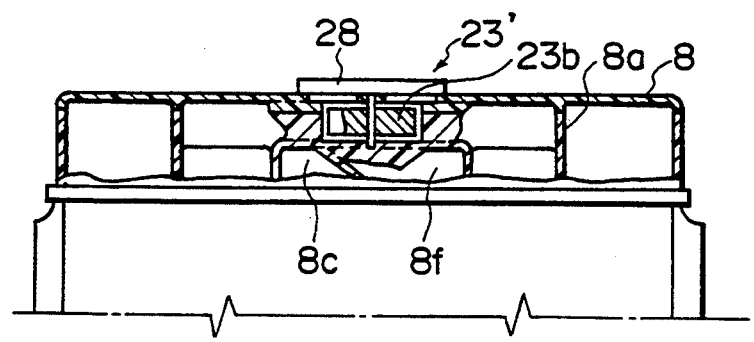
FIG. 29 is a cross-sectional view along line XXIX—XXIX of FIG. 21 according to the eighth embodiment.
Figure 30:
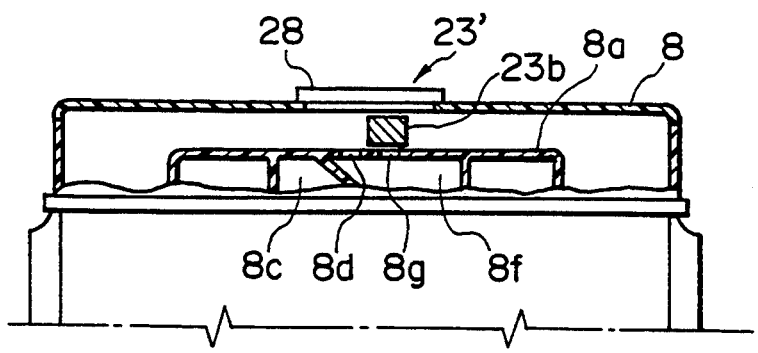
FIG. 30 is a cross-sectional view along line XXX—XXX of FIG. 21 according to the eighth embodiment.

When the valve 23b takes the position shown in FIG. 23, the internal combustion engine inlet 8b guiding the cooling water of the internal combustion engine 3 into the first radiator 5a and the inflow chamber 8c of the third radiator 5c are connected through the inflow hole 8d, the internal combustion engine outlet 8e guiding the cooling water passing through the first radiator 5a to the internal combustion engine 3 and the outflow chamber 8f of the third radiator 5c are connected through the outflow hole 8g, the connection between the intercooler inlet 8h guiding the cooling water of the intercooler 4 into the second radiator 5b and the inflow chamber 8c of the third radiator 5c is inhibited, and the connection of the intercooler outlet 8i guiding the cooling water passing through the second radiator 5b to the intercooler 4 and the outflow chamber 8 of the third radiator 5c is inhibited. That is, when the valve 23b takes the position shown in FIG. 23, the third radiator 5c is connected in parallel with the first radiator 5a FIG. 17 shows this state.

Conversely, when the valve 23b takes the position 180° from the position shown in FIG. 23, the connection between the internal combustion engine inlet 8b and the inflow chamber 8c of the third radiator 5c is cut, the connection between the internal combustion engine outlet 8e and the outflow chamber 8f of the third radiator 5c is cut, the intercooler inlet 8h and the inflow chamber 8c of the third radiator 5c are connected through the inflow hole 8d, and the intercooler outlet 8i and the outflow chamber 8f of the third radiator 5c are connected through the outflow hole 8g. That is, if the valve 23b is set to the position 180° shifted from the position shown in FIG. 23, the third radiator 5c is connected in parallel with the second radiator 5b.

The control apparatus 17 controls the conduction of the servo motor 28 in accordance with the operating state of the internal combustion engine 3, thereby driving the valve 23b and switching the cooling water of the third radiator 5c. In this embodiment, as an example of the operating state of the internal combustion engine 3, when the cooling water temperature of the internal combustion engine 3 is over 100° C., the cooling water of the internal it combustion engine 3 is fed to the third radiator 5c, while when it is less than 100° C., the cooling water of the intercooler 4 is fed to the third radiator 5c.

Next, an explanation will be made of the operation of the eighth embodiment.

When the cooling water temperature of the internal combustion engine 3 is less than 100° C. the control apparatus 17 operates the operating means and connects the third radiator 5c in parallel with the second radiator 5b so that the cooling water of the internal combustion engine 3 has its heat dissipated by just the first radiator 5a. Due to this, the cooling capacity of the intercooler 4 increases, the amount of combustion air taken into the internal combustion engine 3 increases, and the output of the internal combustion engine 3 is improved.

If the load on the internal combustion engine 3 increases, such as during the summer when climbing a slope, and the cooling water temperature of the internal combustion engine 3 rises over 100° C., the control apparatus 17 operates the operating means to connect the third radiator 5c in parallel with the first radiator 5a and dissipate the heat of the cooling water of the intercooler 4 by just the second radiator 5b. By this, the cooling capacity of the cooling water of the internal combustion engine 3 is increased and it is possible to prevent overheating of the internal combustion engine 3.

In the eighth embodiment, as mentioned above, during normal operation, the volume of the radiator for dissipating the heat from the cooling water of the internal combustion engine 3 is made smaller and instead the volume of the radiator of the intercooler 4 is made larger to raise the cooling capacity of the intercooler 4. Further, when the load on the internal combustion engine 3 is high, as mentioned earlier, the volume of the radiator for dissipating the heat from the cooling water of the internal combustion engine 3 becomes larger and it is possible to prevent the internal combustion engine 3 from overheating.

Further, in the present embodiment, by providing the first, second, and third radiators 5a, 5b, and 5c as an integral composite radiator 5', it becomes easy to mount them in a cramped engine compartment.

In the above-mentioned eighth embodiment, the example is shown of the provision of the first, second, and third radiators as an integral unit, but it is also possible to mount some of them or all of them separately in the vehicle.

Also, as an example of the operating state of the internal combustion engine for switching the switching means, illustration was made of the case of the cooling water temperature of the internal combustion engine, but the control for switching of the switching means may also be performed based on the oil temperature, accelerator depression, amount of intake air, and other operating states as well.

The example of the switching means shown was the example of the switching of the cooling water using a servo motor, but the cooling water may also be switched by a solenoid valve, vacuum pressure actuator, or other means.

The example of the water-cooled cooling system shown was that of a water-cooled intercooler, but it is also possible to apply the invention to a water-cooled oil cooler or other cooling system as well.

We claim:

1. A vehicular use cooling apparatus including a radiator having upper and lower tanks, comprising:
   a first cooling water circuit comprising:
      a first inlet passage for guiding the cooling water flowing out from a water-cooled internal combustion engine,
      a first radiator portion being a part of said radiator and having at the upper tank a first inlet which is connected to said first inlet passage and receives cooling water from said engine and at the lower tank a first outlet which discharges the cooled cooling water exchanging heat with air,
      a first outlet passage for returning the cooled cooling water from said first outlet of said first radiator portion to said water-cooled internal combustion engine, and
      a first water circulating means for circulating the cooling water of said water-cooled internal combustion engine to said first radiator portion,
   a second cooling water circuit comprising:

a second inlet passage for guiding the cooling water flowing out from another water-cooled cooling apparatus different from said water-cooled internal combustion engine, a second radiator portion being a part of said radiator and having at the upper tank a second inlet which is connected to said second inlet passage and receives cooling water from said another water-cooled cooling apparatus and at the lower tank a second outlet which discharges the cooled cooling water exchanging heat with air, said portion formed as an integral radiator with said first radiator portion, a second outlet passage for returning the cooled cooling water from said second outlet of said second radiator portion to said other water-cooled cooling apparatus, and a second water circulating means for circulating the cooling water of said other water-cooled cooling apparatus to said second radiator portion, a connection means provided between said first radiator portion and said second radiator portion and in one of the upper and lower tanks, and for being able to selectively block the exchange of cooling water in said first radiator portion and the cooling water in said second radiator portion; and a control means for operating said connection means in accordance with the state of operation of said water-cooled internal combustion engine and/or said other water-cooled cooling apparatus.

2. A vehicular use cooling apparatus as set forth in claim 1, further comprising a detection means for detecting the temperature of the cooling water flowing out from said water-cooled internal combustion engine and outputting a detection signal in accordance with said temperature and wherein said control means for receiving said detection signal from said detection means, comparing said detected temperature with a first reference temperature, and, when said detected temperature is higher than said first reference temperature, placing said connection means in the connection state.

3. A vehicular use cooling apparatus as set forth in claim 2, further comprising a bypass passage for returning the cooling water flowing out from said water-cooled internal combustion engine from said first inlet passage to said first outlet passage to bypass said radiator and a switching valve for selecting whether to pass the cooling water flowing from said water-cooled internal combustion engine through one of said first inlet passage and said bypass passage and wherein said control means receives said detection signal from said detection means in accordance with the temperature of the cooling water flowing out from said engine, compares said detected temperature with a second reference temperature, and, when said detected temperature is lower than said second reference temperature, switches said switching valve to pass the cooling water flowing out from said engine through said bypass passage, and said connection means places said first radiator portion and second radiator portion of said radiator in a connection state.

4. A vehicular use cooling apparatus as set forth in claim 3, wherein said connection means is a plate-shaped valve provided in the upper tank upstream of said radiator and corresponding to the cross-sectional shape of the flow path in said upper tank.

5. A vehicular use cooling apparatus as set forth in claim 4, wherein said connection means further includes a switching valve which is provided inside the lower tank downstream of said radiator and opens and closes in accordance with a pressure difference between said first radiator portion and said second radiator portion.

6. A vehicular use cooling apparatus as set forth in claim 1, wherein said other water-cooled cooling apparatus is one which cools the cooling water in an intercooler of a supercharger.

7. A vehicular use cooling apparatus as set forth in claim 1, wherein said other water-cooled cooling apparatus is one which cools the cooling water in a water-cooled condenser used for an air-conditioning apparatus.

8. A vehicular use cooling apparatus as set forth in claim 1, wherein said other water-cooled cooling apparatus is one which cools both the cooling water in the intercooler of a supercharger and the cooling water in a water-cooled condenser used for an air-conditioning apparatus.

9. A vehicular use cooling apparatus including a radiator having upper and lower tanks comprising:

a first cooling water circuit comprising:

a first inlet passage for guiding the cooling water flowing out from a water-cooled internal combustion engine, a first radiator portion being a part of said radiator and having at the upper tank a first inlet which is connected to said first inlet passage and receives cooling water from said engine and at the lower tank a first outlet which discharges the cooled cooling water exchanging heat with air, a first outlet passage for returning the cooled cooling water from said first outlet of said first radiator portion to said water-cooled internal combustion engine, and a first water circulating means for circulating the cooling water of said water-cooled internal combustion engine to said first radiator portion, a second cooling water circuit comprising:

a second inlet passage for guiding the cooling water flowing out from another water-cooled cooling apparatus different from said water-cooled internal combustion engine, a second radiator portion being a part of said radiator and having at the upper tank a second inlet which is connected to said second inlet passage and receives cooling water from said another water-cooled cooling apparatus and at the lower tank a second outlet which discharges the cooled cooling water exchanging heat with air, a second outlet passage for returning the cooled cooling water from said second outlet of said second radiator portion to said other water-cooled cooling apparatus, and a second water circulating means for circulating the cooling water of said other water-cooled cooling apparatus to said second radiator portion, a third cooling water circuit comprising:

a third inlet passage or said selectively connecting connecting with said first inlet passage or said second inlet passage and guiding the one of the cooling waters of the same, a third radiator portion being a part of said radiator and connecting with said third inlet passage and cooling the cooling water selectively introduced from one of said first inlet passage and said second inlet passage, and a third outlet passage for selectively connecting with one of said first outlet passage and said second outlet passage and guiding the cooling water discharged from said third radiator portion to one of the same;

a first switching means for selectively connecting said third inlet passage to one of said first inlet passage and said second inlet passage so that said third radiator portion becomes parallel with one of said first radiator portion and said second radiator portion, a second switching means for selectively connecting said third outlet passage to one of said first outlet passage and said second outlet passage, and a control means for operating said switching means in accordance with the state of operation of said water-cooled internal combustion engine.

10. A vehicular use cooling apparatus as set forth in claim 9, wherein said first switching means and said second switching means are formed as an integral valve.

11. A vehicular use cooling apparatus as set forth in claim 9, wherein said other water-cooled cooling apparatus in one which cools the cooling water of an intercooler of a supercharger.

12. A vehicular use cooling apparatus as set forth in claim 9, wherein said other water-cooled cooling apparatus is one which cools the cooling water of a water-cooled condenser used for an air-conditioning apparatus.

13. A vehicular use cooling apparatus as set forth in claim 9, wherein said other water-cooled cooling apparatus is one which cools both the cooling water of the intercooler of a supercharger and the cooling water of a water-cooled condenser used for an air-conditioning apparatus.

14. A vehicular use cooling apparatus comprising:
a radiator having upper and lower tanks,
a first cooling water circuit comprising:
  a first inlet passage for guiding the cooling water flowing out from a water-cooled internal combustion engine,
  a first radiator portion being a part of said radiator and having the upper tank a first inlet which is connected to said first inlet passage and receives cooling water from said engine and at the lower tank a first outlet which discharges the cooled cooling water exchanging heat with air,
  a first outlet passage for returning the cooled cooling water from said first outlet of said first radiator portion to said water-cooled internal combustion engine, and
  a first water circulating means for circulating the cooling water of said water-cooled internal combustion engine to said first radiator portion,
a second cooling water circuit comprising:
  a second inlet passage for guiding the cooling water flowing out from another water-cooled cooling apparatus different from said water-cooled internal combustion engine,
  a second radiator portion being a part of said radiator and having at the upper tank a second inlet which is connected to said second inlet passage and receives cooling water from said another water-cooled cooling apparatus and at the lower tank a second outlet which discharges the cooled cooling water exchanging heat with air, said portion formed as an integral radiator with said first radiator portion,
  a second outlet passage for returning the cooled cooling water from said second outlet of said second radiator portion to said other water-cooled cooling apparatus, and
  a second water circulating means for circulating the cooling water of said other water-cooled cooling apparatus to said second radiator portion,
a bypass passage for returning the cooling water flowing out from said water-cooled internal combustion engine from said first inlet passage to said first outlet passage passing said radiator,
a switching valve for selecting whether to pass the cooling water flowing from said water-cooled internal combustion engine through one of said inlet passage and said bypass passage,
a connection means provided between said first radiator portion and said second radiator portion at one of said upper and lower tanks and for being able to block the exchange of cooling water in said first radiator portion and the cooling water at said second radiator portion,
a detection means for detecting the temperature of the cooling water flowing out from said water-cooled internal combustion engine and outputting a detection signal in accordance with said temperature, and
a control means for operating said connection means in accordance with the state of operation of said water-cooled internal combustion engine and/or said other water-cooled cooling apparatus by receiving said detection signal from said detection means, comparing said detected temperature with a first reference temperature, and, when said detected temperature is higher than said firs reference temperature, placing said connection means in the connection state or comparing said temperature with a second reference temperature, and, when said detected temperature is lower than said second reference temperature, switching said switching valve to pass the cooling water flowing out from said engine through said bypass passage, and placing said connection means in the connection state.

* * * * *